United States Patent [19]
Hoshino et al.

[11] Patent Number: 5,848,351
[45] Date of Patent: Dec. 8, 1998

[54] POROUS METALLIC MATERIAL HAVING HIGH SPECIFIC SURFACE AREA, METHOD OF PRODUCING THE SAME, POROUS METALLIC PLATE MATERIAL AND ELECTRODE FOR ALKALINE SECONDARY BATTERY

[75] Inventors: Kouji Hoshino; Yoshitaka Mayuzumi; Tohru Kohno; Norikazu Komada, all of Omiya, Japan

[73] Assignee: Mitsubishi Materials Corporation, Tokyo, Japan

[21] Appl. No.: 737,931

[22] PCT Filed: Apr. 2, 1996

[86] PCT No.: PCT/JP96/00911

§ 371 Date: Mar. 10, 1997

§ 102(e) Date: Mar. 10, 1997

[87] PCT Pub. No.: WO96/31306

PCT Pub. Date: Oct. 10, 1996

[30] Foreign Application Priority Data

| | | | |
|---|---|---|---|
| Apr. 3, 1995 | [JP] | Japan | 7-101773 |
| Sep. 19, 1995 | [JP] | Japan | 7-264930 |
| Sep. 27, 1995 | [JP] | Japan | 7-249899 |
| Nov. 29, 1995 | [JP] | Japan | 7-310438 |
| Nov. 29, 1995 | [JP] | Japan | 7-310439 |
| Nov. 29, 1995 | [JP] | Japan | 7-310440 |
| Nov. 30, 1995 | [JP] | Japan | 7-311744 |

[51] Int. Cl.$^6$ ............................................. B32B 5/18
[52] U.S. Cl. .................... 428/550; 428/547; 428/553; 419/2; 419/40
[58] Field of Search ......................... 428/550, 553, 428/613, 547; 419/2, 40; 75/228

[56] References Cited

U.S. PATENT DOCUMENTS

| | | | |
|---|---|---|---|
| 3,549,423 | 12/1970 | Grubb et al. . | |
| 3,946,039 | 3/1976 | Walz | 264/628 |
| 4,273,582 | 6/1981 | Gutjahr et al. | 419/2 |
| 4,569,821 | 2/1986 | Duperray et al. | 419/2 |
| 5,640,669 | 6/1997 | Harada et al. | 428/552 |

FOREIGN PATENT DOCUMENTS

| | | |
|---|---|---|
| 61-127801 | 6/1986 | Japan . |
| 3-188203 | 8/1991 | Japan . |
| 4034857 | 2/1992 | Japan . |
| 4325604 | 11/1992 | Japan . |
| 536910 | 6/1993 | Japan . |
| 6-287607 | 10/1994 | Japan . |

*Primary Examiner*—Ngoclan Mai
*Attorney, Agent, or Firm*—Armstrong, Westerman, Hattori, McLeland & Naughton

[57] ABSTRACT

The porous metallic material of the present invention has an overall porosity of 80 to 99%, and a skeleton in a three dimensional network structure which is entirely composed of a sintered metal powder having a porosity of 10 to 60%. The specific surface area is very high, for example, 300 to 11000 $cm^2/cm^3$. The porous metallic material can be reinforced by a reinforcing plate. The porous metallic material is also suitable for an electrode of an alkaline secondary battery and enables achievement of increases in the life and the amount of the active material contained therein. The porous metallic material can be produced by preparing a foamable slurry containing a metal powder, forming the foamable slurry, drying the formed product, preferably after foaming, and finally burning the dry formed product.

11 Claims, 9 Drawing Sheets

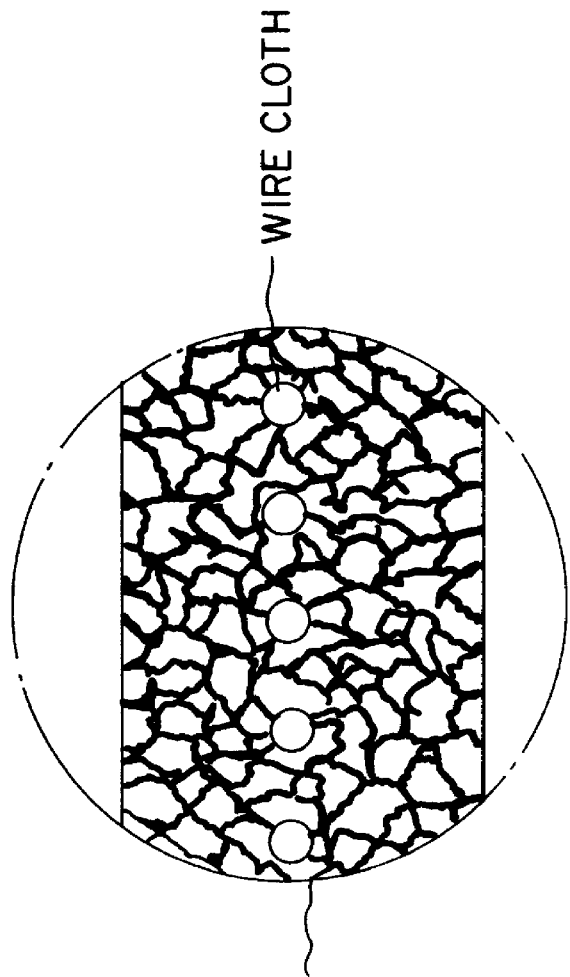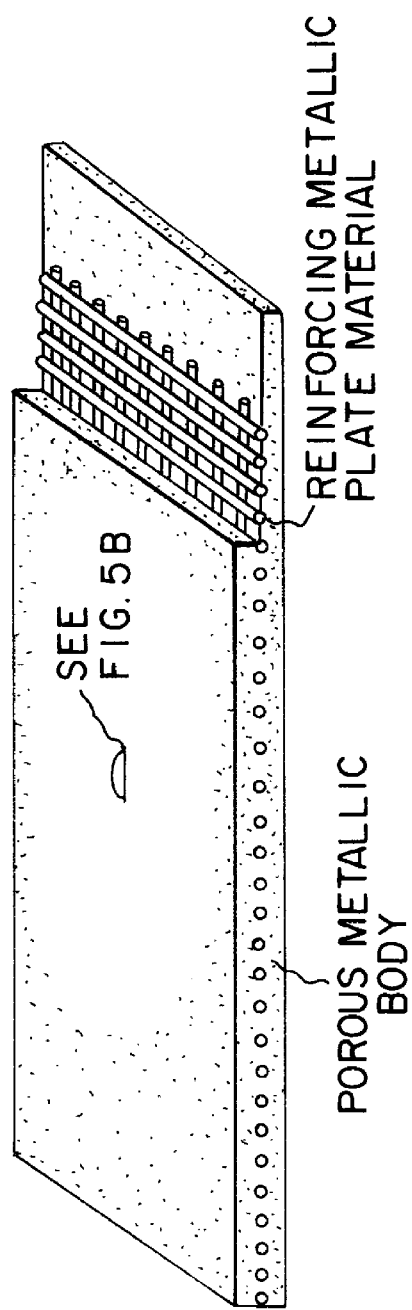
FIG. 5B
FIG. 5A

X400

X400

POROUS METALLIC MATERIAL HAVING HIGH SPECIFIC SURFACE AREA, METHOD OF PRODUCING THE SAME, POROUS METALLIC PLATE MATERIAL AND ELECTRODE FOR ALKALINE SECONDARY BATTERY

TECHNICAL FIELD

The present invention relates to a porous metallic material having a high specific surface area, a method of producing the same, a porous metallic plate material and an electrode for an alkaline secondary battery such as a nickel-cadmium battery, nickel-hydrogen battery or the like.

BACKGROUND ART

Porous metallic materials having a three-dimensional network skeleton in which pores are formed are conventionally used as structural members of various machines and apparatus. For example, such metallic materials are used as an active substance holding material of an electrode of an alkaline secondary battery, a hydrolytic electrode, a kerosene atomizing member of a petroleum heater, a magnetic shield packing, a gas expansion buffer of an air cushion using an explosive, a sound absorbing material, various filters such as a hydrolytic filter of a clarifier, an electrostatic filter of an air clarifier, an oil mist filter for an engine exhaust gas, a filter of a high-temperature exhaust dust collector, etc.

An example of known porous metallic materials is a material having a skeleton which is obtained by plating a spongelike resin and then burning the resin, and which has pores formed therein by burning, as disclosed in, for example, Japanese Patent Laid-Open Patent Application No. 5-6763. This porous metallic material has a specific surface area of 5 to 75 $cm^2/cm^3$ and a porosity of 92 to 97%.

However, it has been required to increase the porosity and specific surface area of the porous metallic material with recent increases in the performance and output of various machines and apparatus and recent decreases in the weight thereof.

On the other hand, an electrode for an alkaline secondary battery such as a nickel-cadmium battery, a nickel-hydrogen battery or the like is produced by a method in which a spongelike porous metallic substrate having pores formed by three-dimensional continuous network connection of a skeleton consisting of a Ni metal is impregnated with a paste formed by kneading an active material powder with a viscous aqueous solution containing 1 to 2% of CMC (carboxymethyl cellulose) and PTFE (polytetrafluoroethylene), dried and then rolled.

The spongelike porous metallic substrate comprising the pores and the skeleton and used for producing an electrode for an alkaline secondary battery can be obtained by Ni-plating an urethane foam, and then burning the urethane foam. The spongelike porous metallic substrate obtained by burning the urethane foam has the skeleton having the pores formed by burning the urethane, and generally has an average pore size of 400 to 600 $\mu$m, a porosity of 93 to 97% and a specific surface area of 40 $cm^2/cm^3$.

For a nickel-cadmium battery of alkaline secondary batteries, nickel hydroxide powder and cadmium hydroxide powder are used as a positive electrode active material and a negative electrode active material, respectively. On the other hand, for a nickel-hydrogen battery, nickel hydroxide powder and hydrogen occluding alloy powder are used as a positive electrode active material and a negative electrode active material, respectively.

When a closed alkaline secondary battery containing a conventional electrode in which pores of a spongelike porous metallic substrate are filled with an active material is repeatedly charged and discharged, the characteristics thereof gradually deteriorate, and the service life is limited to 500 to 1000 times of charging and discharging operations. The deterioration in the closed alkaline secondary battery is caused by an increase in internal pressure due to exhaustion of an electrolyte in a separator. It is said that the exhaustion of the electrolyte is caused by solidification of the electrolyte due to corrosion of the alloy, a change in electrolyte distribution due to swelling of the positive electrode, etc.

Corrosion of the alloy includes corrosion of a metallic member such as a battery can and corrosion of the hydrogen occluding alloy of a nickel-hydrogen battery, and represents the phenomenon that a part of the electrolyte is solidified to produce a corrosion product due to corrosion, thereby decreasing the amount of the electrolyte.

Swelling of the positive electrode is caused by the phenomenon that, when nickel hydroxide as the positive electrode active material is changed to —NiOOH through a crystal structure —NiOOH and —Ni(OH)$_2$ by repetition of the charging and discharging operations, respectively, micropores referred to as "mesopores" are formed in the particle surfaces of the positive electrode active material powder, the electrolyte permeates into the mesopores due to the capillary phenomenon, and thus unevenly distributed in the positive electrode, thereby decreasing the amount of the electrolyte in the separator.

Since the conventional alkaline secondary battery does not have a sufficient life, as described above, an alkaline secondary battery having a longer life is demanded.

It is also known that the capacity of the closed alkaline secondary battery containing an electrode increases as the amount of the active material contained in the electrode increases. However, in an electrode comprising the spongelike porous metallic substrate having pores which are formed by three-dimensional continuous connection of the conventional skeleton consisting of a Ni metal, since the pores formed in the skeleton by burning are closed and filled with no active material, the amount of the active material contained in the electrode is limited. There is thus demand for an electrode containing an increased amount of active material.

DISCLOSURE OF THE INVENTION

In research for developing a porous metallic material having a higher specific surface area than that of the conventional porous metallic material from the above-mentioned viewpoints, the inventors obtained the following results:

A foamable slurry having a composition comprising the following components as raw materials, for example, % by weight ("%" indicates "% by weight" hereinafter) is prepared:

0.05 to 10% of water insoluble hydrocarbon organic solvent having 5 to 8 carbon atoms;
  0.05 to 5% of surfactant;
  0.5 to 20% of water soluble resin binder;
  5 to 80% of metal powder having an average particle size of 0.5 to 500 $\mu$m, and, if required;
  0.1 to 15% of plasticizer comprising at least one of polyhydric alcohols, fats and oils, ethers and esters; and
  the balance consisting of water.

The foamable slurry is formed into a predetermined shape by a known method such as a doctor blade method or a slip cast method, and then maintained at a temperature of 5° C. or higher, to form a porous product having many regular fine cells. The fine cells are generated by vaporization of the water insoluble hydrocarbon organic solvent from the formed product because the solvent has a higher vapor pressure than water. The porous formed product has strength which allows handling due to the water soluble resin binder, and plasticity provided by the plasticizer. When the porous formed product in this state is sintered, the metal powder is sintered to obtain a porous metallic material having a skeleton which comprises a sintered metal powder and which has a foamed three-dimensional network structure, as shown in a schematic drawing of FIG. 1.

Unlike the conventional porous metallic material, the resultant porous metallic material has the porous skeleton in which no pore is formed by burning and which comprises the sintered metal powder having a high porosity of 10 to 60%. Although the overall porosity is 80 to 99%, the porous metallic material has a high specific surface area, e.g., 300 to 11000 $cm^2/cm^3$.

The present invention has been achieved on the basis of the above-mentioned research results, and is characterized by the porous metallic material having a high specific surface area, an overall porosity of 80 to 99% and the three-dimensional network skeleton structure which is composed entirely of the sintered metal powder having a porosity of 10 to 60%.

The method of producing the porous metallic material of the present invention comprises the slurry preparing step of preparing a foamable slurry containing a metal powder, the forming step of forming the foamable slurry, the drying step of drying the formed product, and the sintering step of sintering the dry formed product.

When forming the foamable slurry into the porous formed product, for example, a reinforcing plate such as a wire cloth is extruded together with the foamable slurry to obtain a porous metallic plate material reinforced by the reinforcing plate. The resultant porous metallic plate material has excellent strength and a high specific surface area.

In addition, as a result of research for further increasing the life of an alkaline secondary battery repeatedly charged and discharged, as compared with conventional secondary batteries, the inventors found that the use of the above-mentioned porous metallic material for an electrode of a secondary battery can increase the life of the secondary battery.

Namely, as shown in FIG. 6, a skeleton 2 of a spongelike porous metallic substrate comprising pores 1 and the skeleton 2 comprises a microporous sintered metal having micropores 11 which are smaller than the pores 1. The skeleton 2 comprising the microporous sintered metal is provided with the electrolyte holding ability so that the electrolyte consumed when the specific surface area is increased due to the formation of mesopores in the powder surfaces of the positive electrode active material is replaced by the electrolyte previously held, by means of capillary force, in the micropores 11 of the skeleton 2 of the spongelike porous metallic substrate, which comprises the microporous sintered metal. When the electrolyte is consumed, the electrolyte appropriately oozes out of the micropores 11 of the skeleton 2, thereby preventing exhaustion of the electrolyte in the separator.

On the other hand, since an electrode is produced by filling both the pores 1 and micropores 11 of the spongelike porous metallic substrate with the active material, the electrode containing a large amount of active material which is uniformly dispersed, as compared with a conventional electrode, can be obtained. The use of this electrode enables production of an alkaline secondary battery having a higher capacity than a conventional secondary battery.

The present invention has been achieved on the basis of the above finding.

The present invention is characterized by an electrode of a secondary battery comprising a spongelike porous metallic substrate comprising a three-dimensional network skeleton and pores which are formed by the skeleton and which are filled with an active material, wherein the skeleton has micropores having an average micropore size of 0.5 to 20 $\mu$m and the inside thereof entirely comprises a sintered metal powder having a porosity of 10 to 60%.

If the average micropore size of the skeleton of the spongelike porous metallic substrate which constitutes the electrode of the secondary battery is less than 0.5 $\mu$m, capillary force excessively increases, and thus the electrolyte holding ability excessively increases, thereby reducing oozing of the electrolyte. On the other hand, if the average micropore size exceeds 20 $\mu$m, the electrolyte holding ability is insufficient, and the strength of the spongelike porous metallic substrate is also insufficient. If the microporous sintered metal of the skeleton has a porosity of less than 10%, the amount of the electrolyte held thereby is insufficient. On the other hand, if the porosity exceeds 60%, the spongelike porous metallic substrate has insufficient strength.

Therefore, in the electrode of the alkaline secondary battery of the present invention, the skeleton of the spongelike porous metallic substrate, which comprises the microporous sintered metal, has an average micropore size of 0.5 to 20 $\mu$m (more preferably 1 to 5 $\mu$m), and a porosity of 10 to 60% (more preferably 15 to 35%).

BRIEF DESCRIPTION OF THE DRAWINGS

The present invention will be described in detail below with reference to the attached drawings.

FIG. 5 is a schematic perspective view and enlarged sectional view of a principal portion, illustrating the structure of a porous metallic plate material in accordance with a still further embodiment of the present invention;

BEST MODE FOR CARRYING OUT THE INVENTION

Figure 1:
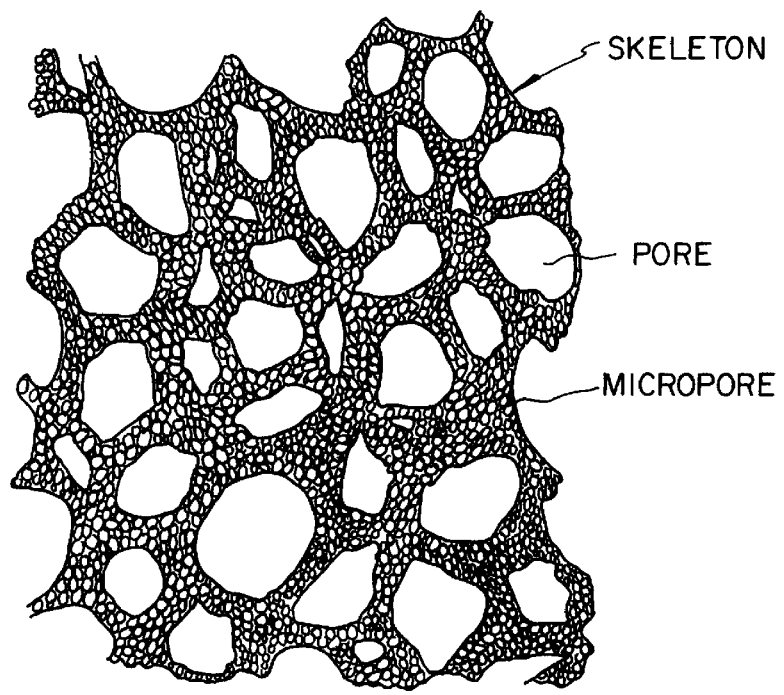
FIG. 1 is a schematic drawing illustrating a skeleton which constitutes a porous metallic material of the present invention.

The porous metallic material of the present invention can be produced through the steps of preparing a foamable slurry, forming, drying, degreasing, and sintering.

The foamable slurry, for example, containing a metal powder, a water-soluble resin binder, a foaming agent, a surfactant and water is first prepared. The type of the metal powder used is not limited, and, any metals and alloys which can be sintered, such as nickel, copper, iron, SUS, chromium, cobalt, gold and silver can be used. Nickel is generally used for producing an electrode of an alkaline secondary battery. The average particle size of the metal powder is not more than 500 um, preferably within the range of 0.5 to 100 $\mu$m. The porosity of the skeleton which constitutes the porous metallic material of the present invention can be adjusted by adjusting the average particle size of the metal powder. With an average particle size of 0.5 $\mu$m or less, the porosity is decreased in some cases. With an average particle size of 500 $\mu$m or more, the strength of the resultant porous sintered metal plate is excessively decreased. The content of the metal powder in the slurry is 5 to 80% (% by weight hereinafter), preferably 30 to 80%.

The water soluble resin binder helps to maintain the shape of the porous formed product when the slurry is dried. The water soluble resin binder also functions as a slurry viscosity modifier. Examples of such a water-soluble resin binder include methyl cellulose, hydroxypropyl methyl cellulose, hydroxyethyl cellulose, carboxymethyl cellulose ammonium, ethyl cellulose, polyvinyl alcohol and the like. The content of the water-soluble resin binder is within the range of 0.5 to 20%, preferably within the range of 2 to 10%. With a content of less than 0.5%, the dry formed product has insufficient strength and cannot be easily handled. On the other hand, with a content of over 20%, the viscosity excessively increases, and forming thus becomes difficult.

The foaming agent may have the ability to form cells by generating gas. Therefore, a compound which generates a gas by decomposition at a predetermined temperature, or a volatile organic solvent can be selected as the foaming agent. Examples of volatile organic solvents include hydrocarbon organic solvents having 5 to 8 carbon atoms. Such organic solvents are liquid at room temperature, volatile, form micelles in the slurry by the action of the surfactant and vaporizes at room temperature or under heating to form fine cells. Examples of hydrocarbon organic solvents having 5 to 8 carbon atoms include pentane, neopentane, hexane, isohexane, isoheptane, benzene, octane, toluene and the like. The content of the foaming agent is 0.05 to 10%, preferably 0.5 to 5%. With a content of less than 0.05%, cells are not sufficiently generated, and the porosity is too low. On the other hand, with a content of over 10%, the size of the cells formed in the formed product is increased due to an increase in the size of micelles, thereby decreasing the strength of the resultant formed product and sintered material. The foamable slurry can be prepared by the method of vigorously mixing a gas such as air in place of the use of the foaming agent.

The surfactant has the function to stabilize the foaming state to form micelles of the foaming agent. Examples of the surfactant include anionic surfactants such as alkyl benzenesulfonates, $\alpha$-olefin sulfonates, alkyl sulfates, alkyl ether sulfates, alkane sulfonates and the like; and nonionic surfactants such as polyethylene glycol derivatives, polyhydric alcohol derivatives and the like. The content of the surfactant is within the range of 0.05 to 5%, preferably 0.5 to 3%. With a content of less than 0.05%, the formation of micelles is made unstable, and fine cells cannot be easily maintained. On the other hand, a content of over 5% causes no further effect.

The foamable slurry of the present invention may contain a plasticizer, a combustible agent for promoting cell formation other than the above components. The plasticizer is added for providing the formed product with plasticity. Examples of the plasticizer include polyhydric alcohols such as ethylene glycol, polyethylene glycol, glycerin and the like; fats and oils such as sardine oil, rape seed oil, olive oil and the like; ethers such as petroleum ether and the like; esters such as diethyl phthalate, di-n-butyl phthalate, diethylhexyl phthalate, dioctyl phthalate, sorbitan monooleate, sorbitan trioleate, sorbitan palmitate, sorbitan stearate and the like. The content of the plasticizer is within the range of 0.1 to 15%, preferably 2 to 10%. A content of less than 0.1% causes insufficient plasticizing effect, while a content of over 15% causes insufficient strength of the formed product.

The combustible agent for promoting cell formation is added for promoting cell formation by disappearing in the burning of the dry formed product. Therefore, an agent which maintains the shape of a powder or fibers and which disappears in burning can be selected. Specifically, a powder having a particle size of about 0.1 to 200 $\mu$m, and fibers having a length of 200 $\mu$m or less, preferably about 30 to 120 $\mu$m, are preferred. Examples of materials for the combustible agent include pulp, cotton, yarn waste, corn starch, carboxylmethyl cellulose, water insoluble cellulose fibers, polyvinyl butyral fibers, polyvinyl fibers, acrylic fibers, polyethylene fibers and the like.

The foamable slurry of the present invention can be obtained by mixing the above components. In this case, the mixing order is not limited, but the foaming agent is preferably finally mixed in order to suppress foaming as much as possible during mixing.

The thus-prepared foamable slurry is then formed. The forming method is not limited, but a doctor blade method, a slip casting method and a coating method are preferable.

Figure 3B:
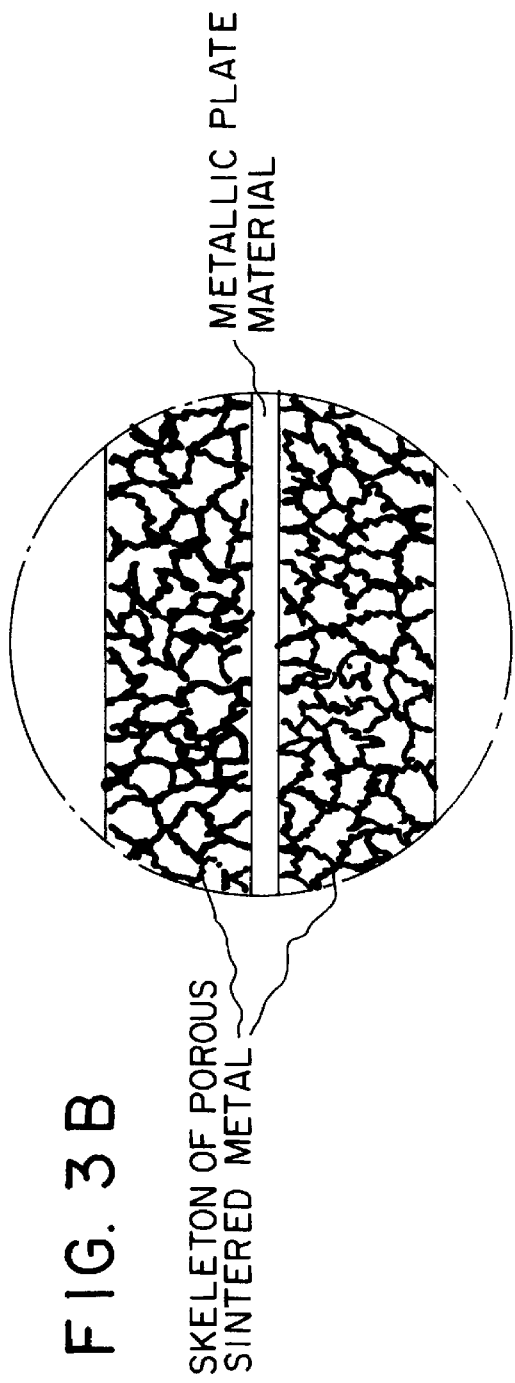
FIG. 3 is a schematic perspective view and enlarged sectional view of a principal portion, illustrating the structure of a porous metallic plate material in accordance with another embodiment of the present invention.
Figure 3A:
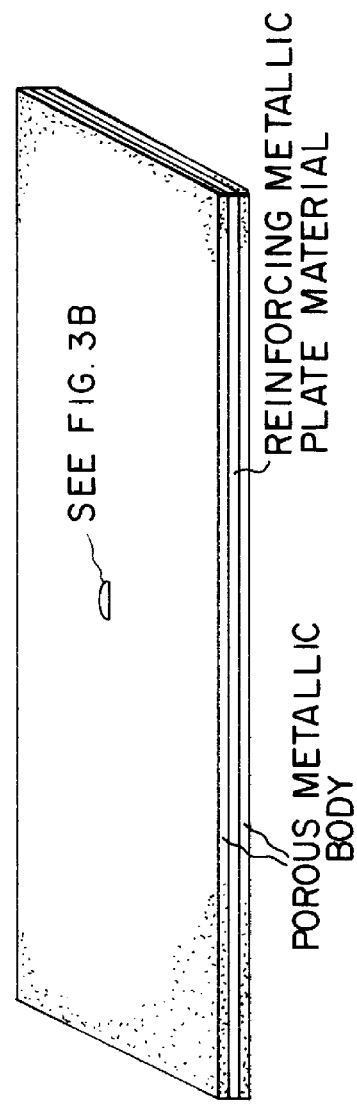
Figure 4B:
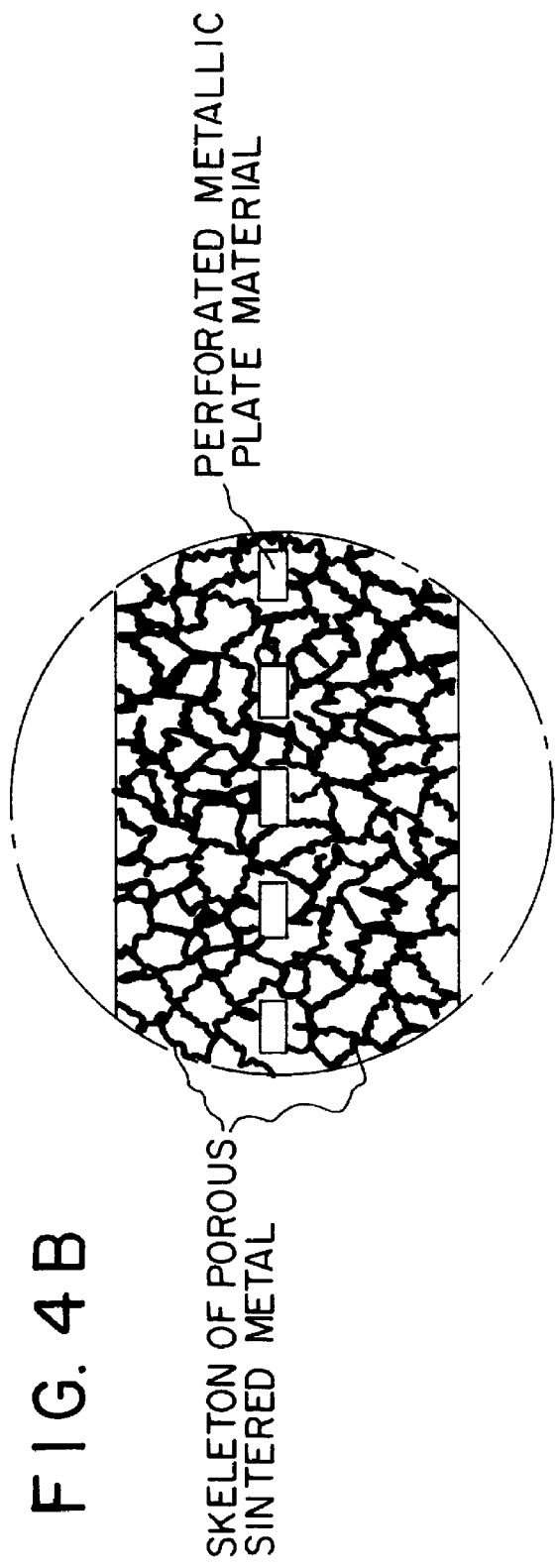
FIG. 4 is a schematic perspective view and enlarged sectional view of a principal portion, illustrating the structure of a porous metallic plate material in accordance with a further embodiment of the present invention.
Figure 4A:
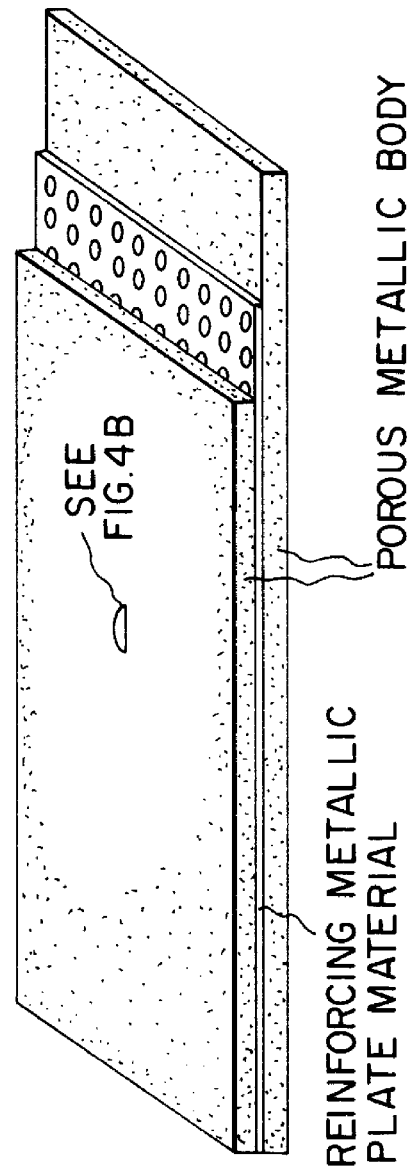
Figure 6:
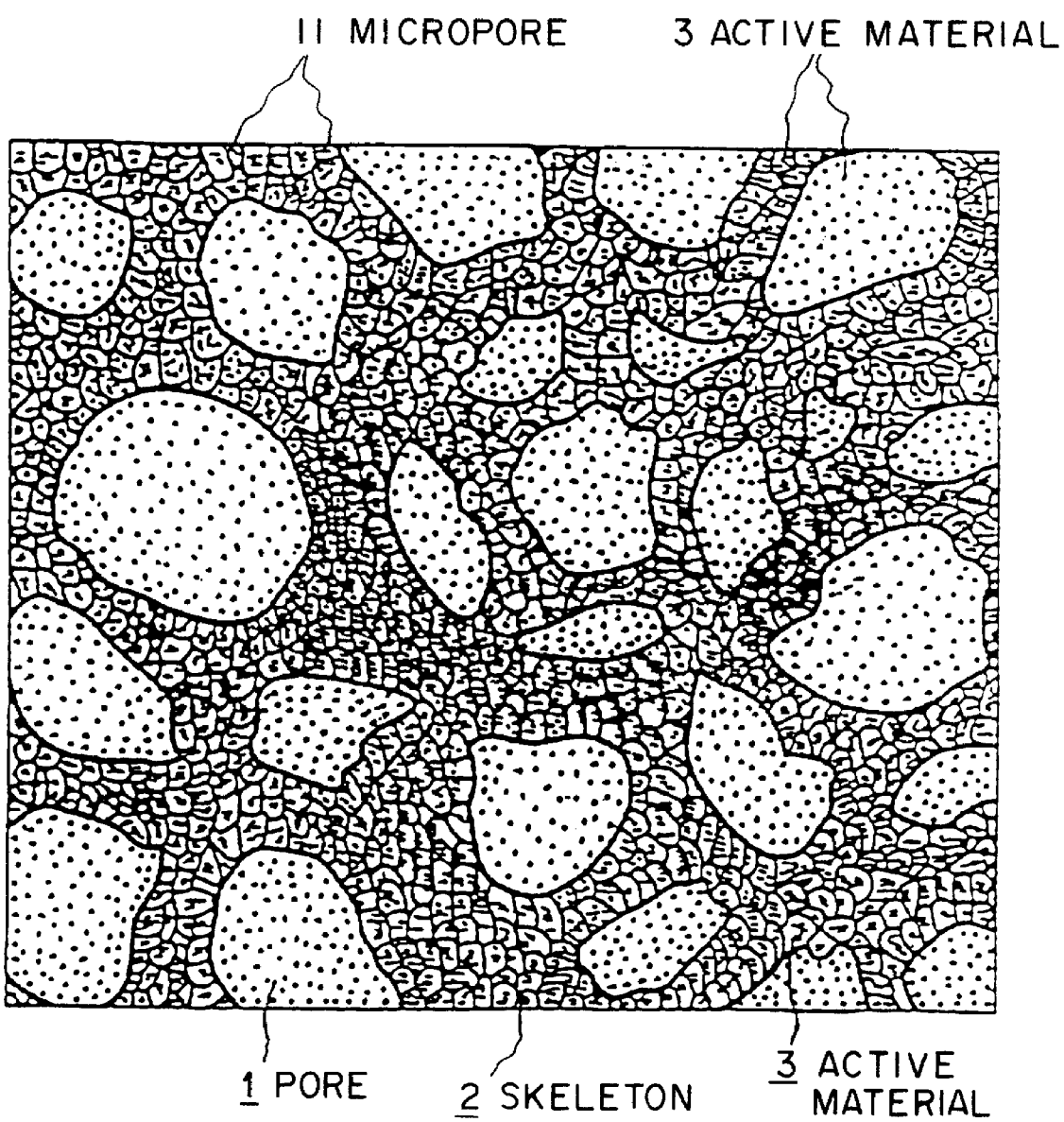
FIG. 6 is a drawing illustrating the sectional structure of an electrode of an alkaline secondary battery of the present invention.

The formed product can be reinforced by using an reinforcing plate such as a plate or perforated plate preferably having a thickness of about 0.6 to 20 mm, or a net preferably of 20 to 200 mesh, which are made of a metal such as stainless steel, gold or copper, ceramic or carbon. For example, the foamable slurry can be coated on both sides of the reinforcing plate, or the reinforcing plate can be extruded together with the formed product so as to obtain a porous metallic plate material comprising the reinforcing plate positioned at the widthwise center of the formed product, as shown in FIGS. 3 to 5. Further, at least two reinforcing plates can be provided in a formed product at predetermined spaces therebetween, or a reinforcing plate can be provided on one or both sides of a formed product to obtain a porous metallic plate material.

In the foaming and drying (cell forming) step, the foaming agent is sufficiently foamed, and at the same time, the formed product is dried. In this step, foaming and drying can be carried out for sufficiently foaming the foaming agent at room temperature to 110° C. If one side or both sides of the formed product are heated at 150° to 300° C. by a far infrared heater immediately after forming, the vicinity of the surface of the formed product irradiated with far infrared rays is rapidly dried, and enlargement and growth of cells in the vicinity of the surface are suppressed, thereby obtaining the formed product having small pores formed on the surface side thereof, and large pores formed on the inside thereof. The formation of such a microporous surface layer increases strength. When a plate is formed, the plate thickness is preferably about 0.4 to 20 mm.

Since cracks easily occur in the surface of the formed product, if the formed product is dried at the same time as foaming, the foaming step is preferably performed before the drying step. Foaming is preferably performed in an atmosphere at a high humidity in order to prevent drying as much as possible. For example, with a slurry viscosity of 35000 cps or more, the humidity is at least 65%, preferably at least 80%. If the humidity is 65% or lower, the surface of the formed product might be cracked in drying. For example, when n-hexane is used as the foaming agent, the foaming temperature is 15° to 65° C., preferably 28 to 40° C. At the foaming temperature of 15° C. or lower, for example, at least 2 hours are required for foaming. At the foaming temperature of over 65° C., the foamed product is excessively foamed, and thus broken. The foaming time is generally within the range of 10 to 45 minutes.

The burning step preferably comprises two steps, i.e. a first step referred to as a degreasing step for volatilizing the organic material (binder), and a second step for sintering the metal powder. These steps can be continuously performed.

In the degreasing step, the formed product can be burned at a temperature of about 300° to 700° C. for 10 to 60 minutes in an atmosphere of air or a reducing gas such as hydrogen gas. In the sintering step, the formed product can be burned at a temperature of about 800° to 1400° C. for 20 to 120 minutes in a reducing atmosphere of ammonia cracked gas or hydrogen gas, under vacuum or in air in accordance with the type of the metal produced.

In this way, a spongelike porous metallic material having a large surface area and a three-dimensional network skeleton structure can be obtained. Since this porous metallic material has the three-dimensional network skeleton comprising a sintered metal powder, the skeleton itself is porous. The porosity of the skeleton is 10 to 60%. The surface area of the metallic material is thus very large, for example, the BET specific surface area is within the range of 300 to 11000 $cm^2/cm^3$. A foamed product having very small pores having a size of less than 100 $\mu$m can easily be obtained, as compared with a conventional method. Specifically, a foamed product having an average pore size within the range of 60 to 700 $\mu$m and a porosity of 80 to 99% by volume can be produced.

When the porous metallic material is elongated or thinned, if the specific surface area thereof is 1000 $cm^2/cm^3$ or more, it is easily deformed, chipped, cracked or broken in handling due to the insufficient strength. In this case, the porous metallic material preferably has an overall specific surface area of about 300 to 1000 $cm^2/cm^3$.

The porous metallic material obtained by the method of the present invention has the aforementioned characteristics, and can thus be usefully applied to, for example, an active material holding material of an electrode of an alkaline secondary battery, a hydrolytic electrode, a kerosene atomizing member of a petroleum heater, a magnetic shield packing, a gas expansion buffer of an air cushion using an explosive, a sound absorbing material, a hydrolytic filter of a clarifier, an electrostatic filter of an air clarifier, an oil mist filter for an engine exhaust gas, a deodorization catalyst of a combustion apparatus such as a petroleum stove, a filter of a high-temperature exhaust dust collector, a substrate of a composite material (CRM) having pores filled with aluminum under high pressure, an industrial catalyst, a carrier, etc.

When the porous metallic material of the present invention is used for an electrode of an alkaline secondary battery, an attempt can be made to increase the life of the alkaline secondary battery.

Although the spongelike porous metallic substrate having the skeleton comprising the microporous sintered metal, which constitutes an electrode of an alkaline secondary battery in accordance with the present invention, generally consists of Ni, the substrate material is not limited to Ni, and a metal or alloy having any composition can be used as long as it has excellent corrosion resistance and conductivity. The spongelike porous metallic substrate having the skeleton comprising the microporous sintered metal, which constitutes an electrode of an alkaline secondary battery in accordance with the present invention, preferably has an overall porosity of 80 to 99% (more preferably 95 to 99%), and a specific surface area of 300 to 1000 $cm^2/cm^3$ (more preferably 400 to 800 $cm^2/cm^3$).

When an electrode of an alkaline secondary battery of the present invention is formed by using the porous metallic material obtained by the aforementioned method, the spongelike porous metallic substrate has an excellent specific surface area of, for example, 300 to 1000 $cm^2/cm^3$, compared with a conventional porous metallic substrate comprising nickel foam and having a specific surface area of 40 $cm^2/cm^3$ at most.

Although the spongelike porous metallic substrate has pores having an average pore size of 60 to 700 $\mu$m, which is substantially the same as that of a conventional material, the amount of the active material contained in the electrode of the alkaline secondary battery of the present invention is 75 to 85 $mg/cm^3$, which is superior to a conventional electrode of an alkaline secondary battery having a content of the active material of 65 $mg/cm^3$ at most.

EXAMPLE 1

The porous metallic material of the present invention is described in detail below with reference to examples.

Various metal powders having the average particle sizes and compositions shown in Tables 1 and 2 were formed. As the organic solvent, the following solvents were used.

Neopentane (referred to as "A-1" hereinafter);

Hexane (referred to as "A-2" hereinafter);

Isohexane (A-3);

Heptane (A-4);

Isoheptane (A-5);

Benzene (A-6);

Octane (A-7); and

Toluene (A-8).

Commercial kitchen neutral synthetic detergents including nonionic surfactants such as polyethylene glycol derivatives, polyhydric alcohol derivatives and the like were used as the water-soluble resin binder:

Methyl cellulose (referred to as "B-1" hereinafter);

Hydroxypropylmethyl cellulose (referred to as "B-2" hereinafter);

Hydroxyethylmethyl cellulose (B-3);

Carboxymethyl cellulose ammonium (B-4);

Ethyl cellulose (B-5); and

Polyvinyl alcohol (B-6).

As the plasticizer, the following compounds were prepared:

Polyethylene glycol (referred to as "C-1" hereinafter);

Olive oil (referred to as "C-2" hereinafter);
Petroleum ether (C-3);
Di-n-butyl phthalate (C-4); and
Sorbitan monooleate (C-5).

These components were added to water in the mixing compositions shown in Tables 1 and 2 and mixed under ordinary conditions to prepare raw material mixtures (foamable slurry) 1a to 1p.

Each of the raw material mixtures was injected into a plaster mold having a cavity surface provided with a plurality of through microholes to form a molded product. The thus-obtained molded product was then subjected to pore formation, degreased and sintered under the conditions shown in Tables 3 and 4 to produce porous metallic materials 1 to 16 of the present invention which had the dimensions of 50 mmØ in diameter×100 mm in length.

For comparison, Ni was deposited to a thickness of 0.5 μm on one side (inner side) of a commercial polyurethane foam to provide the urethane foam with conductivity, and the urethane foam in this state was then dipped in a nickel sulfate aqueous solution and Ni electroplated at a cathode with a current density of 1 A/dm$^2$ to form Ni plated layers having an average thickness of 75 μm on the surfaces of the through holes of the polyurethane foam. The polyurethane foam was then burned by heating at a temperature of 1100° C. for 0.5 hour in a stream of hydrogen to produce a conventional porous metallic material having the dimensions of 50 mmØ in diameter×100 mm in length.

The overall porosity of each of the resultant various porous metallic materials was measured by an image analyzer, and the overall specific surface area was also measured by the BET method. The overall porosity of each of the porous metallic materials 1 to 16 of the present invention includes the porosity of the skeleton. Table 5 shows the averages of measurements obtained at 30 measurement points.

TABLE 1

| | | COMPOSITION (Mass %) | | | | | | |
|---|---|---|---|---|---|---|---|---|
| TYPE | AVERAGE PARTICLE SIZE (μm) | COMPOSITION (wt %) | METAL POWDER | ORGANIC SOLVENT | SURFACTANT | WATER SOLUBLE RESIN BINDER | PLASTICIZER | WATER |
| | | | MIXED RAW MATERIAL | | | | | |
| 1a | 2 | Ni | 65 | A-(2):2 | 1 | B-(2):2.7 | — | BAL. |
| 1b | 9 | Cu | 65 | A-(1):0.5 A-(2):1 | 2.5 | B-(3):3 | — | BAL. |
| 1c | 20 | Cu-20% Ni | 70 | A-(4):1 | 0.06 | B-(6):2 | — | BAL. |
| 1d | 185 9 | Ni Cu | 32 32 | A-(5):2 | 1 | B-(1):0.5 B-(2):1 B-(4):0.6 | — | BAL. |
| 1e | 45 | Ag | 75 | A-(3):2 A-(2):1.5 A-(7):5.5 | 1 | B-(2):1.5 B-(3):2 | — | BAL. |
| 1f | 8 | SUS430 | 32 | A-(6):0.6 | 4.5 | B-(5):19 | — | BAL. |
| 1g | 20 | Au | 75 | A-(8):2.5 | 0.5 | B-(2):2 | — | BAL. |
| 1h | 0.6 9 2 | W Cu Ni | 63 4 1 | A-(7):2 | 1 | B-(1):2.5 | — | BAL. |

TABLE 2

| | | COMPOSITION (Mass %) | | | | | | |
|---|---|---|---|---|---|---|---|---|
| TYPE | AVERAGE PARTICLE SIZE (μm) | COMPOSITION (wt %) | METAL POWDER | ORGANIC SOLVENT | SURFACTANT | WATER SOLUBLE RESIN BINDER | PLASTICIZER | WATER |
| | | | MIXED RAW MATERIAL | | | | | |
| 1i | 2 | Ni | 65 | A-(2):2 | 1 | B-(2):2.7 | C-(5):1 | BAL. |
| 1j | 10 | Ni-15.5% Cr-8% Fe-0.8% Mn | 68 | A-(2):1 A-(3):0.5 | 1.5 | B-(2):2 | C-(1):2.5 | BAL. |
| 1k | 8 | Co-10% Ni-15% Cr | 52 | A-(1):0.5 A-(7):2 A-(8):6.5 | 4.8 | B-(4):2 B-(6):0.9 | C-(3):0.5 C-(4):1.4 C-(5):0.6 | BAL. |
| 1l | 0.6 9 3 | W Cu Co | 63 4.5 0.5 | A-(7):2 | 1 | B-(1):0.5 B-(2):0.5 B-(3):0.5 | C-(1):0.5 C-(5):0.6 | BAL. |
| 1m | 11 | Ag-7.5% Cu | 31 | A-(4):0.6 | 0.06 | B-(5):19 | C-(2):14.5 | BAL. |
| 1n | 185 9 | Ni Cu | 32 32 | A-(5):2 | 1 | B-(3):2 | C-(5):6.1 | BAL. |
| 1o | 35 | Ni-20% Cr | 78 | A-(2):1 | 0.5 | B-(2):1.5 | C-(4):1 | BAL. |
| 1p | 10 | SUS304 | 60 | A-(4):2.5 | 1.5 | B-(2):2 | C-(3):2 | BAL. |

TABLE 3

| | | PORE FORMATION CONDITIONS | | | DEGREASING CONDITION | | | SINTERING CONDITION | | |
|---|---|---|---|---|---|---|---|---|---|---|
| | MIXED RAW | | TEM-PERA- | | | | | | | |
| TYPE | MATERIAL SYMBOL | ATMOS-PHERE | TURE (°C.) | TIME (min.) | ATMOS-PHERE | TEMPERATURE (°C.) | TIME (min.) | ATMOS-PHERE | TEMPERATURE (°C.) | TIME (min.) |
| | | | POROUS METALLIC MATERIAL OF THIS INVENTION | | | | | | | |
| 1 | 1a | AIR WITH 90% HUMIDITY | 60 | 120 | AIR | 500 | 30 | HY-DROGEN | 1150 | 60 |
| 2 | 1b | | 45 | 40 | | 450 | | | 1030 | 120 |
| 3 | 1c | | 30 | 15 | | | | | 1150 | |
| 4 | 1d | | 25 | 30 | | 500 | 60 | | 1000 | 60 |
| 5 | 1e | | 50 | 40 | | | 15 | AIR | 910 | 300 |
| 6 | 1f | | 20 | 30 | | 450 | 240 | HY-DROGEN | 1190 | 120 |
| 7 | 1g | | 50 | 25 | | 500 | 30 | AIR | 1010 | 60 |
| 8 | 1h | | 35 | 120 | HY-DROGEN | 600 | 60 | HY-DROGEN | 1200 | |

TABLE 4

| | | PORE FORMATION CONDITIONS | | | DEGREASING CONDITION | | | SINTERING CONDITION | | |
|---|---|---|---|---|---|---|---|---|---|---|
| | MIXED RAW | | TEM-PERA- | | | | | | | |
| TYPE | MATERIAL SYMBOL | ATMOS-PHERE | TURE (°C.) | TIME (min.) | ATMOS-PHERE | TEMPERATURE (°C.) | TIME (min.) | ATMOS-PHERE | TEMPERATURE (°C.) | TIME (min.) |
| | | | POROUS METALLIC MATERIAL OF THIS INVENTION | | | | | | | |
| 9 | 1i | AIR WITH 90% HUMIDITY | 40 | 60 | AIR | 500 | 30 | HY-DROGEN | 1300 | 180 |
| 10 | 1j | | | | | | | | | 120 |
| 11 | 1k | | 25 | 15 | | 450 | | VAC-UUM | 1320 | |
| 12 | 1l | | 50 | 30 | | | 15 | HY-DROGEN | 1200 | 30 |
| 13 | 1m | | 60 | 60 | | 550 | 120 | AIR | 920 | 120 |
| 14 | 1n | ARGON | 30 | 20 | | 500 | 100 | HY-DROGEN | 1050 | |
| 15 | 1o | NITROGEN | | | HY-DROGEN | 550 | 120 | | 1300 | 180 |
| 16 | 1p | | 40 | 60 | AIR | 450 | 30 | | | |

TABLE 5

| TYPE | OVERALL SPECIFIC SURFACE AREA (cm²/cm²) | OVERALL POROSITY (%) | POROSITY OF SKELETON (%) |
|---|---|---|---|
| | POROUS METALLIC MATERIAL OF THIS INVENTION | | |
| 1 | 390 | 98.6 | 22 |
| 2 | 620 | 95 | 25 |
| 3 | 410 | 95 | 31 |
| 4 | 2800 | 82 | 52 |
| 5 | 350 | 97 | 21 |
| 6 | 1150 | 89 | 41 |
| 7 | 1200 | 88 | 33 |
| 8 | 310 | 97 | 11 |
| 9 | 420 | 96 | 25 |
| 10 | 630 | 95 | 33 |
| 11 | 2400 | 82 | 52 |
| 12 | 590 | 92 | 14 |
| 13 | 660 | 92 | 22 |
| 14 | 2900 | 81 | 54 |
| 15 | 710 | 93 | 23 |
| 16 | 880 | 92 | 31 |
| | CONVENTIONAL POROUS METALLIC MATERIAL (COMPARATIVE EXAMPLE 1) | | |
| | 41 | 95 | — |

Figure 7:
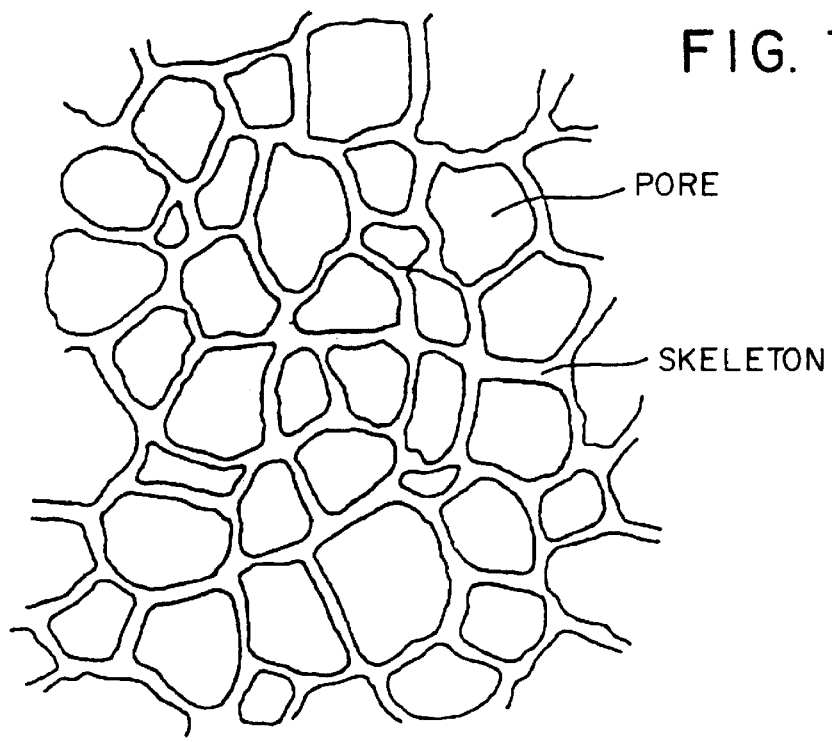
FIG. 7 is a schematic drawing illustrating a skeleton which constitutes a conventional porous metallic material.

The results shown in Table 5 reveal that all porous metallic materials 1 to 16 of the present invention have the skeleton comprising a porous sintered metal, as shown in FIG. 1, and that the porous sintered metal has a high porosity of 10 to 60%, and thus has an extremely high specific surface area, as compared with the conventional porous metallic material (Comparative Example 1) having a skeleton comprising a nonporous metallic hollow material, as shown in FIG. 7.

Figure 9A:
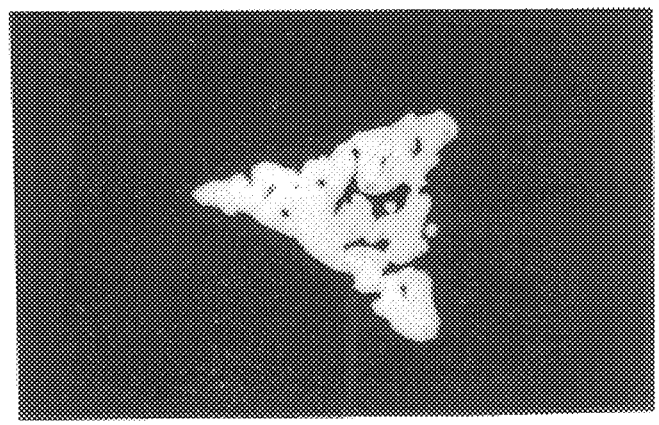
FIG. 9A is a microphotograph showing a cross-section of a skeleton of a porous metallic material in accordance with the present invention.
Figure 10A:
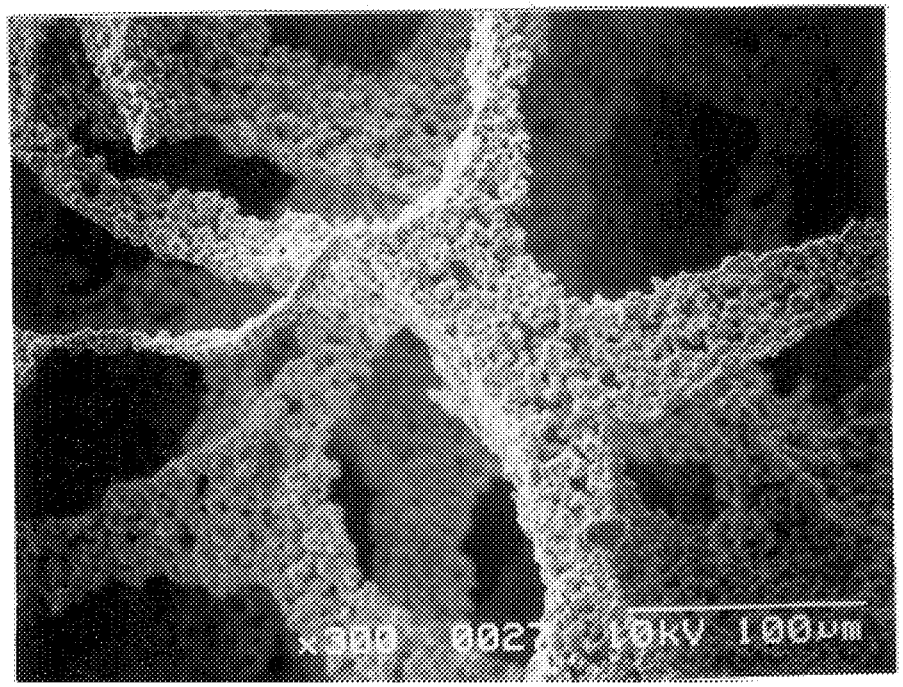
FIG. 10A is a microphotograph showing the appearance of a skeleton of a porous metallic material in accordance with the present invention.

FIG. 9A is a microphotograph showing the cross-sectional structure of the skeleton of the porous metallic material 1 of the present invention. FIG. 10A is a microphotograph showing the appearance of the skeleton of the porous metallic material 1 of the present invention. The magnifications of FIGS. 9A and 10A are X400 and X300, respectively.

As shown in FIGS. 9A and 10A, the porous metallic material of the present invention has the skeleton which is comprised entirely of the porous sintered metal powder.

As described above, the porous metallic material of the present invention has a very large specific surface area, and thus exhibits excellent performance when applied to structural members of various machines and apparatus. It is thus possible to satisfactorily comply with the demands for increasing performance and output of various machines and apparatus and decreasing weights thereof.

Comparative Example 1

A spongelike resin was plated and then burned to obtain a porous metallic material comprising a skeleton having pores formed therein by burning, as shown in a schematic drawing of FIG. 7.

Figure 9B:
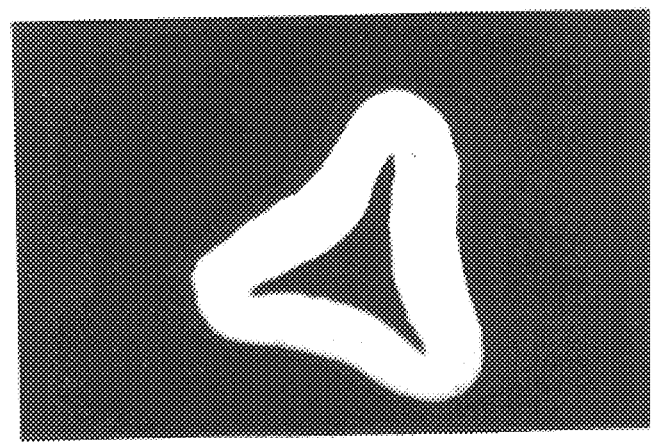
FIG. 9B is a microphotograph showing a cross-section of a skeleton of a porous metallic material in accordance with a comparative example.
Figure 10B:
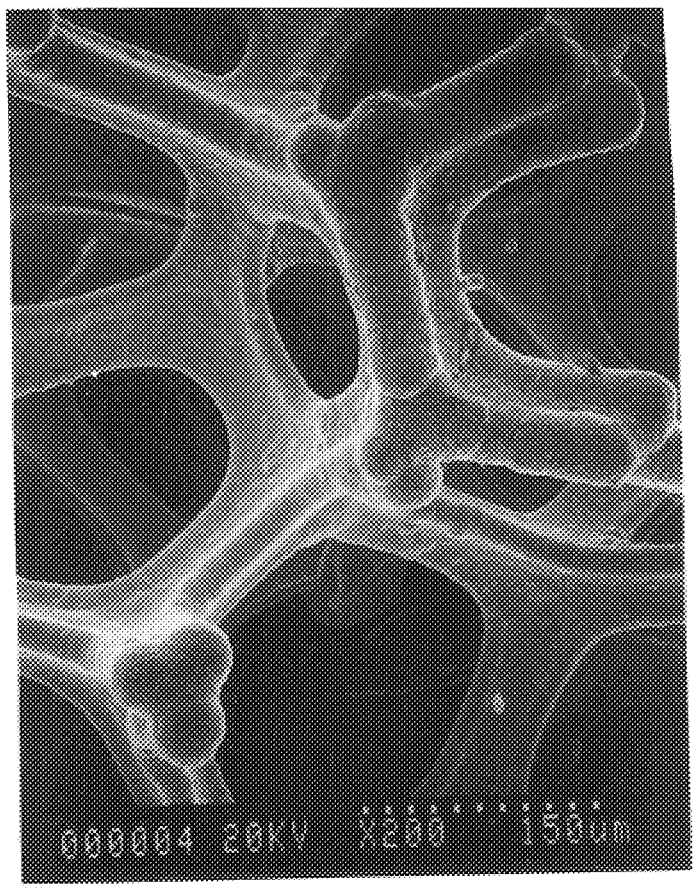
FIG. 10B is a microphotograph showing the appearance of a skeleton of a porous metallic material in accordance with a comparative example.

FIG. 9B shows the cross-sectional shape of the skeleton, and FIG. 10B shows the appearance of the skeleton. The magnifications of FIGS. 9B and 10B are X400 and X200, respectively.

As shown in FIGS. 9B and 10B, the skeleton of the porous metallic material obtained by the method in accordance with the comparative example is not solid and is hollow, and has no pore in the surface thereof.

As a result of measurement of the overall specific surface area and the overall porosity in the same manner as in Example 1, the porous metallic material had a specific surface area of 41 cm$^2$/cm$^3$ and a porosity of 95%, as shown in Table 5.

EXAMPLE 2

Description will now be made of an example in which a porous metallic material is produced so as to form pores in the surface thereof which are smaller than internal pores.

Various metal powders having the average particle sizes and compositions shown in Tables 6 and 7, an organic solvent, the above-described commercial kitchen neutral synthetic detergents as surfactants, a water-soluble resin binder, a plasticizer were prepared, added to water in the mixing compositions shown in Tables 6 and 7 and mixed under ordinary conditions to prepare mixtures 2a to 2p.

As the organic solvent, neopentane [A-(1)], hexane [A-(2)], isohexane [A-(3)], heptane [A-(4)], isoheptane [A-(5)], benzene [A-(6)], octane [A-(7)] and toluene [A-(8)] were used. As the water-soluble resin binder, methyl cellulose [B-(1)], hydroxypropylmethyl cellulose [B-(2)], hydroethylmethyl cellulose [B-(3)], carboxymethyl cellulose ammonium [B-(4)], ethyl cellulose [B-(5)], and polyvinyl alcohol [B-(6)] were used. As the plasticizer, polyethylene glycol [C-(1)], olive oil [C-(2)], petroleum ether [C-(3)], n-butyl phthalate [C-(4)], sorbitan monooleate [C-(5)] and glycerin were used.

Each of the mixtures 2a to 2p was coated to a predetermined thickness on a carrier sheet by a known doctor blade method to form a plate. One side of the thus-formed plate was irradiated with far infrared rays by a far infrared heating device at a predetermined heater surface temperature within the range of 150° to 300° for a predetermined time within the range of 30 to 300 seconds, and then subjected to pore formation under the conditions shown in Table 8. The plate was degreased by being held at a temperature of 500° C. for 2 hours in air, and then sintered under the conditions shown in Table 8, to produce each of porous metallic plates 17 to 32 of the present invention each having the thickness shown in Table 9 and a porous surface layer on one side thereof.

For comparison, Ni was deposited to a thickness of 0.5 μm on one side of a commercial polyurethane foam plate to provide the polyurethane foam with conductivity, and the polyurethane foam plate in this state was dipped in a nickel sulfate aqueous solution to perform Ni electroplating thereon at a cathode with a current density of 0.5 A/dm$^2$, to form Ni plated layers having an average thickness of 50 μm on the surfaces of the through holes of the polyurethane foam. The polyurethane foam was then burned by heating at 1100° C. for 0.5 hour in a stream of hydrogen to produce a conventional porous metallic plate having a thickness of 1.6 mm.

The overall porosity and the overall specific surface area of each of the resultant porous metallic plate materials 17 to 32 of the present invention and the conventional porous metallic plate were measured by using an image analyzer and the BET method, respectively. The porosity of the skeleton which constitutes each of the porous metallic plate materials, the thickness of the porous surface layer, and the sizes of the pores formed by the skeleton in the porous surface layer and the central portion of the plate material were further measured. Table 9 show averages of the measurements obtained at 30 measurement points.

TABLE 6

| | | COMPOSITION (Mass %) | | | | | | |
|---|---|---|---|---|---|---|---|---|
| TYPE | AVERAGE PARTICLE SIZE (μm) | COMPOSITION (wt %) | METAL POWDER | ORGANIC SOLVENT | | SURFACTANT | WATER SOLUBLE RESIN BINDER | PLASTICIZER | WATER |
| | | | MIXED RAW MATERIAL | | | | | |
| 2a | 9 | Ni | 50 | A-1:0.6 | | 2.5 | B-4:4<br>B-5:1 | — | BAL. |
| 2b | 40 | Cu | 50 | A-2:0.5 | | 0.07 | B-1:5 | — | BAL. |
| 2c | 460 | Cu-10% Ni | 60 | A-6:0.5<br>A-8:1 | | 4.8 | B-3:0.8 | — | BAL. |
| 2d | 2<br>40 | Ni<br>Cu | 25<br>25 | A-7:0.07 | | 2 | B-1:2<br>B-3:2 | — | BAL. |
| 2e | 20 | Au | 78 | A-2:5<br>A-4:2.5<br>A-7:2 | | 3 | B-2:7 | — | BAL. |
| 2f | 40 | Ag | 70 | A-4:0.4 | | 4 | B-6:2 | — | BAL. |
| 2g | 110<br>35<br>9 | Fe<br>Cr<br>Ni | 37<br>9<br>4 | A-5:5 | | 2 | B-4:15 | — | BAL. |

TABLE 6-continued

| | COMPOSITION (Mass %) | | | | | | | |
|---|---|---|---|---|---|---|---|---|
| TYPE | AVERAGE PARTICLE SIZE (μm) | COMPOSITION (wt %) | METAL POWDER | ORGANIC SOLVENT | SURFACT- ANT | WATER SOLUBLE RESIN BINDER | PLAS- TICIZER | WAT- ER |
| 2h | 110 | Fe | 3 | A-3:0.3 | 0.5 | B-1:10 | — | BAL. |
|  | 65 | Co | 3 | A-4:0.7 |  | B-2:4 |  |  |
|  |  |  |  |  |  | B-5:5 |  |  |

TABLE 7

| | COMPOSITION (Mass %) | | | | | | | |
|---|---|---|---|---|---|---|---|---|
| TYPE | AVERAGE PARTICLE SIZE (μm) | COMPOSITION (wt %) | METAL POWDER | ORGANIC SOLVENT | SURFACT- ANT | WATER SOLUBLE RESIN BINDER | PLAS- TICIZER | WAT- ER |
| | MIXED RAW MATERIAL | | | | | | | |
| 2i | 12 | SUS310S | 40 | A-2:0.2 | 2 | B-1:9.5 | C-1:3 | BAL. |
|  |  |  |  | A-4:0.2 |  | B-3:0.5 |  |  |
|  |  |  |  | A-7:0.2 |  |  |  |  |
| 2j | 108 | SUS304 | 40 | A-2:0.8 | 0.08 | B-2:5 | C-3:1.5 | BAL. |
|  |  |  |  |  |  |  | C-5:1 |  |
| 2k | 460 | Cu-10% Ni | 75 | A-4.3 | 2 | B-1:0.8 | C-3:0.2 | BAL. |
| 2l | 13 | Ni | 24 | A-3.0 | 1 | B-3:5 | C-1:9 | BAL. |
|  | 0.6 | Cr | 6 |  |  |  | C-4:3 |  |
|  |  |  |  |  |  |  | C-5:2 |  |
| 2m | 15 | Co-10% Ni-15% Cr | 45 | A-5:0.08 | 1.5 | B-4:4 | C-2:0.1 | BAL. |
| 2n | 12 | Co-10% Ni 20% Cr-15% W | 6 | A-4:0.6 | 1.5 | B-2:8 | C-2.5 | BAL. |
|  |  |  | 6 |  |  | B-4:0.5 | C-3:5 |  |
|  |  |  |  |  |  | B-6:0.5 |  |  |
| 2o | 110 | Fe | 25 | A-1:0.3 | 5 | B-5:5 | C-4:1 | BAL. |
|  | 65 | Co | 13.5 | A-6:0.3 |  |  |  |  |
|  | 13 | Ni | 7.5 |  |  |  |  |  |
| 2p | 12 | Ni | 45 | A-8:0.7 | 0.6 | B-6:6 | C-5:6 | BAL. |

TABLE 8

| | MIXED RAW MATERIAL SYMBOL | PORE FORMATION CONDITION | | | SINTERING CONDITION | | |
|---|---|---|---|---|---|---|---|
| TYPE | | ATMOS- PHERE | TEMPE- RATURE (°C.) | TIME (min.) | ATMOS- PHERE | TEMPE- RATURE (°C.) | TIME (min.) |
| POROUS METALLIC PLATE MATERIAL OF THIS INVENTION | | | | | | | |
| 17 | 2a | AIR | 25 | 90 | HYDROGEN | 1200 | 60 |
| 18 | 2b |  | 30 |  |  | 1000 |  |
| 19 | 2c |  | 105 | 20 |  |  |  |
| 20 | 2d |  | 25 | 90 |  | 1060 | 120 |
| 21 | 2e |  | 5 | 180 | VACUUM | 1030 | 60 |
| 22 | 2f |  |  |  |  | 900 | 240 |
| 23 | 2g | NITROGEN | 10 | 120 | HYDROGEN | 1250 | 30 |
| 24 | 2h | ARGON |  |  |  | 1300 | 60 |
| 25 | 2i | AIR | 30 | 90 |  | 1250 |  |
| 26 | 2j |  |  |  |  |  |  |
| 27 | 2k |  | 10 | 120 |  | 1000 |  |
| 28 | 2l | ARGON | 20 | 90 |  | 1250 |  |
| 29 | 2m | AIR | 105 | 20 | VACUUM |  |  |
| 30 | 2n |  |  |  |  | 1350 |  |
| 31 | 2o |  | 25 | 90 | HYDROGEN | 1250 |  |
| 32 | 2p |  |  |  |  | 1100 |  |

TABLE 9

| TYPE | THICKNESS OF PLATE MATERIAL (mm) | POROUS SURFACE LAYER | | AVERAGE PORE SIZE OF CENTRAL PORTION OF PLATE | POROSITY OF SKELETON (%) | OVERALL POROSITY (%) | OVERALL SPECIFIC SURFACE AREA (cm²/cm²) |
|---|---|---|---|---|---|---|---|
| | | THICKNESS (mm) | AVERAGE PORE SIZE (mm) | | | | |
| POROUS METALLIC PLATE MATERIAL OF THIS INVENTION | | | | | | | |
| 17 | 2.1 | 0.30 | 0.11 | 0.46 | 40 | 98 | 4100 |
| 18 | 4.9 | 0.51 | 0.11 | 0.51 | 35 | 88 | 1700 |
| 19 | 42.1 | 3.2 | 0.24 | 0.92 | 55 | 81 | 1000 |
| 20 | 10.8 | 1.2 | 0.21 | 0.47 | 49 | 80 | 1100 |
| 21 | 3.3 | 0.22 | 0.07 | 0.39 | 33 | 85 | 3200 |
| 22 | 5.5 | 0.51 | 0.10 | 0.40 | 30 | 94 | 2600 |
| 23 | 18.1 | 0.60 | 0.26 | 0.61 | 41 | 92 | 2000 |
| 24 | 17.1 | 0.41 | 0.25 | 0.66 | 34 | 82 | 1700 |
| 25 | 3.0 | 0.45 | 0.14 | 0.51 | 32 | 87 | 3800 |
| 26 | 9.5 | 1.2 | 0.11 | 0.49 | 45 | 80 | 1500 |
| 27 | 16.9 | 3.1 | 0.23 | 0.97 | 54 | 88 | 1050 |
| 28 | 4.0 | 0.9 | 0.09 | 0.38 | 36 | 97 | 5400 |
| 29 | 2.1 | 0.70 | 0.09 | 0.41 | 39 | 83 | 2700 |
| 30 | 1.6 | 0.34 | 0.20 | 0.39 | 40 | 86 | 2900 |
| 31 | 9.0 | 1.0 | 0.26 | 0.71 | 41 | 88 | 2200 |
| 32 | 39.8 | 2.2 | 0.20 | 0.59 | 32 | 80 | 3200 |
| CONVENTIONAL POROUS METALLIC PLATE MATERIAL | | | | | | | |
| | 1.5 | — | — | 0.70 | — | 95 | 51 |

The results shown in Table 9 reveal that all porous metallic plate materials 17 to 32 of the present invention have the skeleton which comprises the porous sintered metal, as shown in FIG. 1, and which has a high porosity of 30 to 60%, and thus have extremely high specific surface areas, as compared with the conventional porous metallic plate having the skeleton comprising a nonporous metal, as shown in FIG. 7.

As described above, the porous metallic plate materials of the present invention have very high specific surface areas and maintain strength due to the porous surface layers. The porous metallic plate materials thus exhibit excellent performance when applied to structural members of various machines and apparatus, and can satisfactorily comply with the demands for increasing performance and output of various machines and apparatus.

EXAMPLE 3

Description will now be made of an example in which a porous metallic plate is produced so as to form surface pores smaller than internal pores.

Various metal powders having the average particle sizes and compositions shown in Tables 10 and 11, an organic solvent, the above commercial kitchen neutral synthetic detergents as surfactants, a water-soluble resin binder, a plasticizer were prepared, added to water in the mixing compositions shown in Tables 10 and 11, and mixed under ordinary conditions to prepare mixtures 3a to 3p.

As the organic solvent, neopentane (A-1), hexane (A-2), isohexane (A-3), heptane (A-4), isoheptane (A-5), benzene (A-6), octane (A-7) and toluene (A-8) were used. As the water-soluble resin binder, methyl cellulose (B-1), hydroxypropylmethyl cellulose (B-2), hydroxyethylmethyl cellulose (B-3), carboxymethyl cellulose ammonium (B-4), ethyl cellulose (B-5) and polyvinyl alcohol (B-6) were used. As the plasticizer, polyethylene glycol (C-1), olive oil (C-2), petroleum ether (C-3), di-n-butyl phthalate (C-4) and sorbitan monooleate (C-5) were used.

Each of the mixtures 3a to 3p was coated to a predetermined thickness on a carrier sheet by the known doctor blade method to form a plate. One side of the thus-formed plate was irradiated with far infrared rays by a far infrared heating device at a predetermined heater surface temperature within the range of 150° to 300° for a predetermined time within the range of 30 to 300 seconds, and then subjected to pore formation under the conditions shown in Table 12. The plate was degreased by being held at a temperature of 500° C. for 2 hours in air, and then sintered under the conditions shown in Table 12, to produce each of porous metallic plate materials 33 to 48 of the present invention each having the thickness shown in Table 13 and a porous surface layer on one side thereof.

For comparison, Ni was deposited to a thickness of 0.5 μm on one side of a commercial polyurethane foam plate to provide the polyurethane foam with conductivity, and the polyurethane foam plate in this state was dipped in a nickel sulfate aqueous solution to perform Ni electroplating thereon at a cathode with a current density of 0.5 A/dm², to form Ni plated layers having an average thickness of 50 μm on the surfaces of the through holes of the polyurethane foam. The polyurethane foam was then burned by heating at 1100° C. for 0.5 hour in a stream of hydrogen to produce a conventional porous metallic plate material having a thickness of 1.6 mm.

The overall porosity and the overall specific surface area of each of the resultant porous metallic plate materials 17 to 32 of the present invention and the conventional porous metallic plate material were measured by using an image analyzer and the BET method, respectively. The porosity of the skeleton which constitutes each of the porous metallic plate materials, the thickness of the porous surface layer, and the sizes of the pores formed, by the skeleton, in the porous surface layer and the central portion of the plate material were further measured. Table 13 shows the averages of the measurements obtained at 30 measurement points.

TABLE 10

| | | COMPOSITION (Mass %) | | | | | | |
|---|---|---|---|---|---|---|---|---|
| TYPE | AVERAGE PARTICLE SIZE (μm) | COMPOSITION (wt %) | METAL POWDER | ORGANIC SOLVENT | SURFACTANT | WATER SOLUBLE RESIN BINDER | PLAS-TICIZER | WATER |
| | | | MIXED RAW MATERIAL | | | | | |
| 3a | 2 | Ni | 65 | A-(2):2 | 1 | B-(2):2.7 | — | BAL. |
| 3b | 9 | Cu | 65 | A-(1):0.5 A-(2):1 | 2.5 | B-(3):3 | — | BAL. |
| 3c | 20 | Cu-20% Ni | 70 | A-(4):1 | 0.06 | B-(6):2 | — | BAL. |
| 3d | 185 9 | Ni Cu | 32 32 | A-(5):2 | 1 | B-(1):0.5 B-(2):1 B-(4):0.6 | — | BAL. |
| 3e | 45 | Ag | 75 | A-(3):2 A-(2):1.5 A-(7):5.5 | 1 B-(3):2 | B-(2):1.5 | — | BAL. |
| 3f | 8 | SUS430 | 32 | A-(6):0.6 | 4.5 | B-(5):19 | — | BAL. |
| 3g | 20 | Au | 75 | A-(8):2.5 | 0.5 | B-(2):2 | — | BAL. |
| 3h | 0.6 9 2 | W Cu Ni | 63 4 1 | A-(7):2 | 1 | B-(1):2.5 | — | BAL. |

TABLE 11

| | | COMPOSITION (Mass %) | | | | | | |
|---|---|---|---|---|---|---|---|---|
| TYPE | AVERAGE PARTICLE SIZE (μm) | COMPOSITION (wt %) | METAL POWDER | ORGANIC SOLVENT | SURFACT-ANT | WATER SOLUBLE RESIN BINDER | PLASTICIZER | WATER |
| | | | MIXED RAW MATERIAL | | | | | |
| 3i | 2 | Ni | 65 | A-(2):2 | 1 | B-(2):2.7 | C-(6):1 | BAL. |
| 3j | 10 | Ni-15.5% Cr-8% Fe-0.8% Mn | 68 | A-(2):1 A-(3):0.5 | 1.5 | B-(2):2 | C-(1):2.5 | BAL. |
| 3k | 8 | Co-10% Ni 15% Cr | 52 | A-(1):0.5 A-(7):2 A-(8):6.5 | 4.8 | B-(4):2 B-(6):0.9 | C-(3):0.5 C-(4):1.4 C-(5):0.6 | BAL. |
| 3l | 0.6 9 3 | W Cu Co | 63 4.5 0.5 | A-(7):2 | 1 | B-(1):0.5 B-(2):0.5 B-(3):0.5 | C-(1):0.5 C-(5):0.5 | BAL. |
| 3m | 11 | Ag-7.5% Cu | 31 | A-(4):0.6 | 0.06 | B-(5):19 | C-(2):14.5 | BAL. |
| 3n | 185 9 | Ni Cu | 32 32 | A-(5):2 | 1 | B-(3):2 | C-(5):6.1 | BAL. |
| 3o | 35 | Ni-20% Cr | 78 | A-(2):1 | 0.5 | B-(2):1.5 | C-(4):1 | BAL. |
| 3p | 10 | SUS430 | 60 | A-(4):2.5 | 1.5 | B-(2):2 | C-(3):2 | BAL. |

TABLE 12

| TYPE | MIXED RAW MATERIAL SYMBOL | PORE FORMATION CONDITION | | | SINTERING CONDITION | | |
|---|---|---|---|---|---|---|---|
| | | ATMOS-PHERE | TEMPE-RATURE (°C.) | TIME (min.) | ATMOS-PHERE | TEMPE-RATURE (°C.) | TIME (min.) |
| | | POROUS METALLIC PLATE MATERIAL OF THIS INVENTION | | | | | |
| 33 | 3a | AIR | 40 | 60 | HYDROGEN | 1300 | 240 |
| 34 | 3b | | 45 | 40 | | 1030 | 120 |
| 35 | 3c | | 30 | 15 | | 1150 | |
| 36 | 3d | | 25 | 30 | | 1000 | 60 |
| 37 | 3e | | 50 | 40 | AIR | 910 | 300 |
| 38 | 3f | | 20 | 30 | HYDROGEN | 1190 | 120 |
| 39 | 3g | | 50 | 25 | AIR | 1010 | 60 |
| 40 | 3h | | 35 | 120 | HYDROGEN | 1200 | |
| 41 | 3i | | 40 | 60 | | 1300 | 180 |
| 42 | 3j | | | | | | 120 |
| 43 | 3k | | 25 | 15 | VACUUM | 1320 | |
| 44 | 3l | | 50 | 30 | HYDROGEN | 1200 | 30 |

TABLE 12-continued

| | | PORE FORMATION CONDITION | | | SINTERING CONDITION | | |
|---|---|---|---|---|---|---|---|
| TYPE | MIXED RAW MATERIAL SYMBOL | ATMOSPHERE | TEMPERATURE (°C.) | TIME (min.) | ATMOSPHERE | TEMPERATURE (°C.) | TIME (min.) |
| 45 | 3m | | 60 | 60 | AIR | 920 | 120 |
| 46 | 3n | | 30 | 20 | HYDROGEN | 1050 | |
| 47 | 3o | | | | | 1300 | 180 |
| 48 | 3p | | 40 | 60 | | | |

TABLE 13

| TYPE | THICKNESS OF PLATE MATERIAL (mm) | POROUS SURFACE LAYER THICKNESS (mm) | POROUS SURFACE LAYER AVERAGE PORE SIZE (mm) | AVERAGE PORE SIZE OF CENTRAL PORTION OF PLATE (mm) | POROSITY OF SKELETON (%) | OVERALL POROSITY (%) | OVERALL SPECIFIC SURFACE AREA (cm$^2$/cm$^2$) |
|---|---|---|---|---|---|---|---|
| POROUS METALLIC PLATE MATERIAL OF THIS INVENTION | | | | | | | |
| 33 | 2.2 | 0.30 | 0.10 | 0.50 | 22 | 96 | 400 |
| 34 | 5.1 | 0.50 | 0.11 | 0.52 | 25 | 94 | 640 |
| 35 | 42.3 | 3.2 | 0.23 | 0.90 | 31 | 97 | 430 |
| 36 | 11.0 | 1.2 | 0.21 | 0.50 | 52 | 81 | 2900 |
| 37 | 3.5 | 0.23 | 0.07 | 0.40 | 21 | 96 | 360 |
| 38 | 5.7 | 0.51 | 0.10 | 0.58 | 41 | 87 | 1200 |
| 39 | 18.3 | 0.60 | 0.25 | 0.81 | 33 | 88 | 1200 |
| 40 | 17.4 | 0.41 | 0.24 | 0.62 | 11 | 97 | 310 |
| 41 | 3.2 | 0.42 | 0.14 | 0.54 | 25 | 94 | 440 |
| 42 | 9.8 | 1.2 | 0.11 | 0.52 | 33 | 94 | 630 |
| 43 | 17.2 | 3.1 | 0.23 | 0.97 | 52 | 80 | 2450 |
| 44 | 4.4 | 0.9 | 0.08 | 0.38 | 14 | 88 | 670 |
| 45 | 2.5 | 0.70 | 0.09 | 0.41 | 22 | 87 | 820 |
| 46 | 1.8 | 0.34 | 0.20 | 0.40 | 54 | 80 | 2900 |
| 47 | 9.2 | 1.0 | 0.25 | 0.80 | 23 | 92 | 730 |
| 48 | 39.8 | 2.2 | 0.20 | 0.61 | 31 | 91 | 900 |
| CONVENTIONAL POROUS METALLIC PLATE MATERIAL | | | | | | | |
| | 1.0 | — | — | 0.70 | — | 95 | 51 |

Figure 2B:
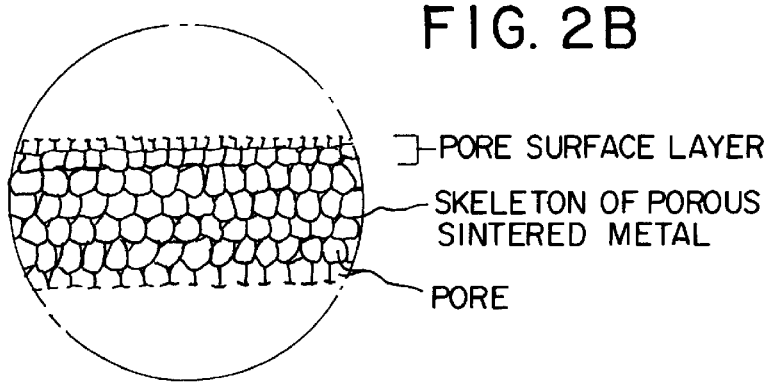
FIG. 2 is a schematic perspective view and enlarged sectional view of a principal portion, illustrating a porous metallic plate material in accordance with an embodiment of the present invention.
Figure 2A:
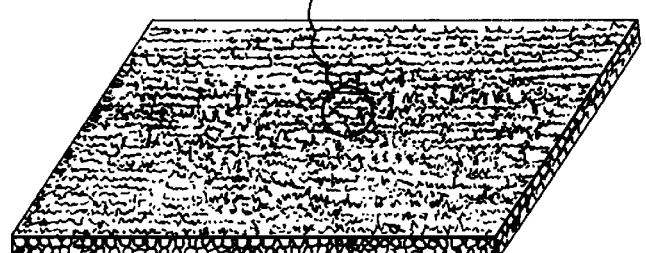

The results shown in Table 13 reveal that all porous metallic plate materials 33 to 48 of the present invention have the skeleton which comprises the porous sintered metal, as shown in FIGS. 1 and 2, and which has a high porosity of 10 to 60%, and thus have extremely high specific surface areas, as compared with the conventional porous metallic plate material having the skeleton comprising a nonporous metal, as shown in FIG. 7.

As described above, the porous metallic plate materials of the present invention have very high specific surface areas and maintain strength due to the porous surface layers. The porous metallic plate materials thus exhibit excellent performance when applied to structural members of various machines and apparatus, and can satisfactorily comply with the demands for increasing performance and output of various machines and apparatus.

EXAMPLE 4

A porous metallic plate material reinforced by a reinforcing metallic plate of the present invention is described in detail with reference to an example.

Various metal powders having the average particle sizes and compositions shown in Tables 14 and 15, an organic solvent, the above commercial kitchen neutral synthetic detergents as surfactants, a water-soluble resin binder and a plasticizer were prepared, added to water in the compositions shown in Tables 14 and 15, and mixed under ordinary conditions to prepare mixtures 4a to 4p.

As the organic solvent, neopentane (A-1), hexane (A-2), isohexane (A-3), heptane (A-4), isoheptane (A-5), benzene (A-6), octane (A-7) and toluene (A-8) were used. As the water-soluble resin binder, methyl cellulose (B-1), hydroxypropylmethyl cellulose (B-2), hydroxyethylmethyl cellulose (B-3), carboxymethyl cellulose ammonium (B-4), ethyl cellulose (B-5) and polyvinyl alcohol (B-6) were used. As the plasticizer, polyethylene glycol (C-1), olive oil (C-2), petroleum ether (C-3), di-n-butyl phthalate (C-4), and sorbitan monooleate (C-5) were used.

Reinforcing metal plates A to E respectively comprising the materials and having thicknesses (mesh) and shapes shown in Table 16 were prepared.

A container was charged with each of mixtures 4a to 4p, and the reinforcing metallic plates A to E was dipped in the mixture in the combinations shown in Tables 17 and 18. The reinforcing metallic plate was drawn out from a slit having a predetermined width and provided in the container to form a plate comprising the reinforcing metallic plate at the center in the direction of the thickness thereof. The thus-formed plate was subjected to pore formation under the conditions shown in Table 17 and 18, degreased by being held at a temperature of 500° C. for 2 hours in air, and then sintered under the conditions shown in Tables 17 and 18 to produce porous metallic plate materials 49 to 64 each having the thickness shown in Table 19 and any one of the structures shown in a schematic perspective view and an enlarged sectional view of a principal portion of FIGS. 3 to 5.

For comparison, Ni was deposited to a thickness of 0.5 μm on one side (inner side) of a commercial polyurethane foam plate to provide the polyurethane foam with conductivity, and the polyurethane foam plate in this state was dipped in a nickel sulfate aqueous solution to perform Ni electroplating thereon at a cathode with a current density of 1 A/dm$^2$, to form Ni plated layers having an average thickness of 75 μm on the surfaces of the through holes of the polyurethane foam. The polyurethane foam was then burned by heating at 1100° C. for 0.5 hour in a stream of hydrogen to produce a conventional porous metallic plate material having a thickness of 3 mm.

The overall porosity and the overall specific surface area of each of the resultant porous metallic plate materials 49 to 64 of the present invention and the conventional porous metallic plate material were measured by using an image analyzer and the BET method, respectively. The porosity of the skeleton comprising a porous sintered metal which constitutes each of the porous metallic plate materials was further measured. Table 19 show the averages of the measurements obtained at 30 measurement points.

TABLE 14

COMPOSITION (Mass %)

| TYPE | AVERAGE PARTICLE SIZE (μm) | COMPOSITION (wt %) | METAL POWDER | ORGANIC SOLVENT | SURFACTANT | WATER SOLUBLE RESIN BINDER | PLAS-TICIZER | WATER |
|---|---|---|---|---|---|---|---|---|
| | | | | MIXTURE | | | | |
| 4a | 9 | Ni | 50 | A-1:0.6 | 2.5 | B-4:4<br>B-5:1 | — | BAL. |
| 4b | 40 | Cu | 50 | A-2:0.5 | 0.07 | B-1:5 | — | BAL. |
| 4c | 460 | Cu-10% Ni | 60 | A-6:0.5<br>A-8:1 | 4.8 | B-3:0.6 | — | BAL. |
| 4d | 2<br>40 | Ni<br>Cu | 25<br>25 | A-7:0.07 | 2 | B-1:2<br>B-3:2 | — | BAL. |
| 4e | 20 | Au | 78 | A-2:5<br>A-4:2.5<br>A-7:2 | 3 | B-2:7 | — | BAL. |
| 4f | 40 | Ag | 70 | A-4:0.4 | 4 | B-6:2 | — | BAL. |
| 4g | 110<br>35<br>9 | Fe<br>Cr<br>Ni | 37<br>9<br>4 | A-5:5 | 2 | B-4:15 | — | BAL. |
| 4h | 110<br>65 | Fe<br>Co | 3<br>3 | A-3:0.3<br>A-4:0.7 | 0.5 | B-1:10<br>B-2:4<br>B-5:5 | — | BAL. |

TABLE 15

COMPOSITION (Mass %)

| TYPE | AVERAGE PARTICLE SIZE (μm) | COMPOSITION (wt %) | METAL POWDER | ORGANIC SOLVENT | SURFACT-ANT | WATER SOLUBLE RESIN BINDER | PLASTICIZER | WATER |
|---|---|---|---|---|---|---|---|---|
| | | | | MIXTURE | | | | |
| 4i | 12 | SUS310S | 40 | A-2:0.2<br>A-4:0.2<br>A-7:0.2 | 2 | B-1:9.5<br>B-3:9.5 | C-1:3 | BAL. |
| 4j | 108 | SUS304 | 40 | A-2:0.8 | 0.08 | B-2:5 | C-3:1.5<br>C-5:1 | BAL. |
| 4k | 460 | Cu-10% Ni | 75 | A-4:3 | 2 | B-1:0.8 | C-3:0.2 | BAL. |
| 4l | 13<br>0.6 | Ni<br>Cr | 24<br>6 | A-3.9 | 1 | B-3:5 | C-1:9<br>C-4:8<br>C-5:2 | BAL. |
| 4m | 15 | Co-10% Ni<br>-15% Cr | 45 | A-5:0.08 | 1.5 | B-4:4 | C-2:0.1 | BAL. |
| 4n | 12 | Co-10% Ni<br>-20% Cr-15% W | 6 | A-4:0.6 | 1.5 | B-2:8<br>B-4:0.5<br>B-6:0.5 | C-2:5<br>C-3:5 | BAL. |
| 4o | 110<br>65<br>13 | Fe<br>Co<br>Ni | 25<br>13.5<br>7.5 | A-1:0.3<br>A-6:0.3 | 5 | B-5:5 | C-4:1 | BAL. |
| 4p | 12 | Ni | 45 | A-8:0.7 | 0.6 | B-6:6 | C-5:6 | BAL. |

TABLE 16

| TYPE | MATERIAL | THICKNESS OR PARTICLE SIZE | SHAPE |
|---|---|---|---|
| REINFORCING METALLIC PLATE MATERIAL ||||
| A | Ni | 48 mesh | WIRE CLOTH HAVING A WIRE DIAMETER OF 0.5 m |
| B | Cu | 0.3 m | PARFORATED PLATE IN WHICH HOLES HAVING A DIAMETER OF 1 m ARE FORMED WITH A PITCH 1.8 m |
| C | Ni | 0.1 mm | PLATE MATERIAL |
| D | Au | 100 mesh | WIRE CLOTH HAVING A WIRE DIAMETER OF 0.1 m |
| E | SUS316L | 0.3 m | PARFORATED PLATE IN WHICH HOLES HAVING A DIAMETER OF 1 mm ARE FORMED WITH A PITCH 1.8 mm |

TABLE 17

| TYPE | MIXED RAW MATERIAL SYMBOL | REINFORCING METALLIC PLATE MATERIAL SYMBOL | PORE FORMATION CONDITION ||| SINTERING CONDITION |||
|---|---|---|---|---|---|---|---|---|
| | | | ATMOS-PHERE | TEMPERATURE (°C.) | TIME (min.) | ATMOS-PHERE | TEMPERATURE (°C.) | TIME (mm) |
| POROUS METALLIC MATERIAL OF THIS INVENTION |||||||||
| 49 | 4a | A | AIR | 25 | 90 | HYDROGEN | 1200 | 60 |
| 50 | 4b | B | | 30 | | | 1000 | |
| 51 | 4c | B | | 105 | 20 | | | |
| 52 | 4d | A | | 25 | 90 | | 1060 | 120 |
| 53 | 4e | D | | 5 | 180 | VACUUM | 1030 | 60 |
| 54 | 4f | D | | 10 | 120 | | 900 | 240 |
| 55 | 4g | E | NITROGEN | | | HYDROGEN | 1250 | 30 |
| 56 | 4h | E | ARGON | | | | 1300 | 60 |

TABLE 18

| TYPE | MIXED RAW MATERIAL SYMBOL | REINFORCING METALLIC PLATE MATERIAL SYMBOL | PORE FORMATION CONDITION ||| SINTERING CONDITION |||
|---|---|---|---|---|---|---|---|---|
| | | | ATMOS-PHERE | TEMPERATURE (°C.) | TIME (min.) | ATMOS-PHERE | TEMPERATURE (°C.) | TIME (mm) |
| POROUS METALLIC MATERIAL OF THIS INVENTION |||||||||
| 57 | 4i | E | AIR | 30 | 90 | HYDROGEN | 1250 | 60 |
| 58 | 4j | E | | | | | | |
| 59 | 4k | B | | 10 | 120 | | 1000 | |
| 60 | 4l | A | ARGON | 20 | 90 | | 1250 | |
| 61 | 4m | E | AIR | 105 | 20 | VACUUM | | |
| 62 | 4n | E | | | | | 1350 | |
| 63 | 4o | C | | 25 | 90 | HYDROGEN | 1250 | |
| 64 | 4p | C | | | | | 1100 | |

TABLE 19

| TYPE | THICKNESS (mm) | OVERALL SPECIFIC SURFACE AREA (cm²/cm²) | OVERALL POROSITY (%) | POROSITY OF SKELETON (%) |
|---|---|---|---|---|
| POROUS METALLIC PLATE MATERIAL OF THIS INVENTION |||||
| 49 | 2.2 | 4200 | 92 | 40 |
| 50 | 3.0 | 1800 | 90 | 35 |
| 51 | 6.8 | 1000 | 84 | 55 |
| 52 | 4.2 | 10500 | 81 | 49 |
| 53 | 0.6 | 3100 | 88 | 33 |
| 54 | 0.8 | 2700 | 94 | 30 |
| 55 | 1.9 | 2100 | 93 | 41 |
| 56 | 2.8 | 1900 | 82 | 34 |
| 57 | 10.1 | 4000 | 88 | 32 |
| 58 | 18.8 | 1500 | 81 | 45 |
| 59 | 3.1 | 1100 | 87 | 54 |
| 60 | 2.2 | 5500 | 97 | 36 |

TABLE 19-continued

| TYPE | THICK-NESS (mm) | OVERALL SPECIFIC SURFACE AREA (cm²/cm²) | OVERALL POROSITY (%) | POROSITY OF SKELETON (%) |
|---|---|---|---|---|
| 61 | 5.0 | 2900 | 84 | 39 |
| 62 | 3.1 | 3000 | 88 | 40 |
| 63 | 0.8 | 2200 | 89 | 41 |
| 64 | 0.9 | 3300 | 80 | 32 |
| CONVENTIONAL POROUS METALLIC PLATE MATERIAL | | | | |
| | 3.0 | 41 | 95 | — |

The results shown in Table 19 reveal that all porous metallic bodies which constitute the porous metallic plate materials 49 to 64 of the present invention have the skeleton which comprises the porous sintered metal, as shown in FIG. 1, and which has a high porosity of 30 to 60%, and that the porous metallic plate materials thus have extremely high specific surface areas, as compared with the conventional porous metallic plate material having the skeleton comprising a nonporous metal, as shown in FIG. 7.

As described above, the porous metallic plate materials of the present invention have very high specific surface areas and maintain strength due to the porous surface layers. The porous metallic plate materials thus exhibit excellent performance when applied to structural members of various machines and apparatus, and can satisfactorily comply with the demands for increasing performance and output of various machines and apparatus.

EXAMPLE 5

Description will now be made of another example of a porous metallic plate material reinforced by a reinforcing plate material of the present invention.

Various metal powders having the average particles sizes and compositions shown in Tables 20 and 21, an organic solvent, the above commercial kitchen neutral synthetic detergents as surfactants, a water-soluble resin binder and a plasticizer were prepared, added to water in the compositions shown in Tables 20 and 21, and mixed under ordinary conditions to prepare mixtures 5a to 5p.

As the organic solvent, neopentane [A-(1)], hexane [A-(2)], isohexane [A-(3)], heptane [A-(4)], isoheptane [A-(5)], benzene [A-(6)], octane [A-(7)] and toluene [A-(8)] were used. As the water-soluble resin binder, methyl cellulose [B-(1)], hydroxypropylmethyl cellulose [B-(2)], hydroxyethylmethyl cellulose [B-(3)], carboxymethyl cellulose ammonium [B-(4)], ethyl cellulose [B-(5)] and polyvinyl alcohol [B-(6)] were used. As the plasticizer, polyethylene glycol [C-(1)], olive oil [C(2)], petroleum ether [C-(3)], di-n-butyl phthalate [C(4)], and sorbitan monooleate [C-(5)] were used.

Reinforcing metal plates A to E respectively comprising the materials and having thicknesses (mesh) and shapes shown in Table 22 were prepared.

A container was charged with each of mixtures 5a to 5p, and each of the reinforcing metallic plates A to E was dipped in the mixture in the combinations shown in Tables 23 and 24. The reinforcing metallic plate was drawn out from a slit having a predetermined width and provided in the container to form a plate comprising the reinforcing metallic plate at the center in the direction of the thickness thereof. The thus-formed plate was subjected to pore formation, degreased, and then sintered under the conditions shown in Table 23 and 24 to produce porous metallic plate materials 65 to 80 having the thicknesses shown in Table 25 and each of the structures shown in a schematic perspective view and an enlarged sectional view of a principal portion of FIGS. 3 to 5.

For comparison, Ni was deposited to a thickness of 0.5 μm on one side (inner side) of a commercial polyurethane foam plate to provide the polyurethane foam with conductivity, and the polyurethane foam plate in this state was dipped in a nickel sulfate aqueous solution to perform Ni electroplating thereon at a cathode with a current density of 1 A/dm², to form Ni plated layers having an average thickness of 75 μm on the surfaces of the through holes of the polyurethane foam. The polyurethane foam was then burned by heating at 1100° C. for 0.5 hour in a stream of hydrogen to produce a conventional porous metallic plate material having a thickness of 3 mm.

The overall porosity and the overall specific surface area of each of the resultant porous metallic plate materials 65 to 80 of the present invention and the conventional porous metallic plate material were measured by using an image analyzer and the BET method, respectively. The porosity of the skeleton comprising a porous sintered metal which constitutes each of the porous metallic plate materials was further measured. Table 25 show averages of the measurements obtained at 30 measurement points.

TABLE 20

| | | | COMPOSITION (Mass %) | | | | | |
|---|---|---|---|---|---|---|---|---|
| TYPE | AVERAGE PARTICLE SIZE (μm) | COMPOSITION (wt %) | METAL POWDER | ORGANIC SOLVENT | | SURFACTANT | WATER SOLUBLE RESIN BINDER | PLAS-TICIZER | WATER |
| | | | MIXED RAW MATERIAL | | | | | |
| 5a | 2 | Ni | 65 | A-(2):2 | | 1 | B-(2):2.7 | — | BAL. |
| 5b | 9 | Cu | 50 | A-(1):0.5 A-(2):1 | | 2.5 | B-(3):3 | — | BAL. |
| 5c | 20 | Cu-20% Ni | 70 | A-(4):1 | | 0.06 | B-(6):2 | — | BAL. |
| 5d | 185 9 | Ni Cu | 32 32 | A-(5):2 | | 1 | B-(1):0.5 B-(2):1 B-(4):0.6 | — | BAL. |
| 5e | 45 | Ag | 75 | A-(3):2 A-(2):1.5 A-(7):5.5 | | 1 | B-(2):1.5 B-(3):2 | — | BAL. |
| 5f | 8 | SUS430 | 32 | A-(6):0.6 | | 4.5 | B-(5):19 | — | BAL. |
| 5g | 20 | Au | 75 | A-(8):2.5 | | 0.5 | B-(2):2 | — | BAL. |

TABLE 20-continued

| | | COMPOSITION (Mass %) | | | | | | |
|---|---|---|---|---|---|---|---|---|
| TYPE | AVERAGE PARTICLE SIZE (μm) | COMPOSITION (wt %) | METAL POWDER | ORGANIC SOLVENT | SURFACTANT | WATER SOLUBLE RESIN BINDER | PLAS- TICIZER | WATER |
| 5h | 0.6 | W | 63 | A-(7):2 | 2 | B-(1):2.5 | — | BAL. |
| | 9 | Cu | 4 | | | | | |
| | 2 | Ni | 1 | | | | | |

TABLE 21

| | | COMPOSITION (Mass %) | | | | | | |
|---|---|---|---|---|---|---|---|---|
| TYPE | AVERAGE PARTICLE SIZE (μm) | COMPOSITION (wt %) | METAL POWDER | ORGANIC SOLVENT | SURFACTANT | WATER SOLUBLE RESIN BINDER | PLASTICIZER | WATER |
| | | MIXED RAW MATERIAL | | | | | | |
| 5i | 2 | Ni | 65 | A-(2):2 | 1 | B-(2):2.7 | C-(5):1 | BAL. |
| 5j | 10 | Ni-15.5% Cr-8% Fe- 0.8% Mn | 68 | A-(2):1 A-(3):0.5 | 1.5 | B-(2):2 | C-(1):2.5 | BAL. |
| 5k | 8 | Co-10% Ni -15% Cr | 52 | A-(1):0.5 A-(7):2 A-(8):6.5 | 4.8 | B-(4):2 B-(6):0.9 | C-(3):0.5 C-(4):1.4 C-(5):0.6 | BAL. |
| 5l | 0.6 | W | 63 | A-(7):2 | 1 | B-(1):0.5 | C-(1):0.5 | BAL. |
| | 9 | Cu | 4.5 | | | B-(2):0.5 | C-(5):0.6 | |
| | 3 | Co | 0.5 | | | B-(3):0.5 | | |
| 5m | 11 | Ag-7.5% Cu | 31 | A-(4):0.6 | 0.06 | B-(5):19 | C-(2):14.5 | BAL. |
| 5n | 185 | Ni | 32 | A-(5):2 | 1 | B-(3):2 | C-(5):6.1 | BAL. |
| | 9 | Cu | 32 | | | | | |
| 5o | 35 | Ni-20% Cr | 78 | A-(2):1 | 0.5 | B-(2):1.5 | C-(4):1 | BAL. |
| 5p | 10 | SUS304 | 60 | A-(4):2.5 | 1.5 | B-(2):2 | C-(3):2 | BAL. |

TABLE 22

| TYPE | MATERIAL | THICKNESS OR PARTICLE SIZE | SHAPE |
|---|---|---|---|
| | | REINFORCING METALLIC PLATE MATERIAL | |
| A | Ni | 48 mesh | WIRE CLOTH HAVING A WIRE DIAMETER OF 0.5 m |
| B | Cu | 0.3 mm | PARFORATED PLATE IN WHICH HOLES HAVING A DIAMETER OF 1 mm ARE FORMED WITH A PITCH 1.8 mm |
| C | Ni | 0.1 mm | PLATE MATERIAL |
| D | Au | 100 mesh | WIRE CLOTH HAVING A WIRE DIAMETER OF 0.1 mm |
| E | SUS316L | 0.3 mm | PARFORATED PLATE IN WHICH HOLES HAVING A DIAMETER OF 1 mm ARE FORMED WITH A PITCH 1.8 mm |

TABLE 23

| TYPE | MIXED RAW MATERIAL SYMBOL | REINFORC- ING METALLIC PLATE MATERIAL SYMBOL | PORE FORMATION CONDITION | | | DEGREASING CONDITION | | | SINTERING CONDITION | | |
|---|---|---|---|---|---|---|---|---|---|---|---|
| | | | ATMOS- PHERE | TEMPER- ATURE (°C.) | TIME (min.) | ATMOS- PHERE | TEMPER- ATURE (°C.) | TIME (m) | ATMOS- PHERE | TEMPER- ATURE (°C.) | TIME (mm) |
| | | | POROUS METALLIC MATERIAL OF THIS INVENTION | | | | | | | | |
| 65 | 5a | A | AIR WITH 90% HUM- IDITY | 40 | 60 | AIR | 500 | 30 | HYDRO- GEN | 1300 | 240 |
| 66 | 5b | B | | 45 | 40 | | | | | 1030 | 120 |
| 67 | 5c | B | | 30 | 15 | | 450 | | | 1150 | |
| 68 | 5d | A | | 25 | 30 | | 500 | 60 | | 1000 | 60 |
| 69 | 5e | D | | 50 | 40 | | | 15 | AIR | 910 | 300 |
| 70 | 5f | D | | 20 | 30 | | 450 | 240 | HYDRO- GEN | 1190 | 120 |
| 71 | 5g | E | | 50 | 25 | | 500 | 30 | AIR | 1010 | 60 |

TABLE 23-continued

| TYPE | MIXED RAW MATERIAL SYMBOL | REINFORCING METALLIC PLATE MATERIAL SYMBOL | PORE FORMATION CONDITION | | | DEGREASING CONDITION | | | SINTERING CONDITION | | |
|---|---|---|---|---|---|---|---|---|---|---|---|
| | | | ATMOSPHERE | TEMPERATURE (°C.) | TIME (min.) | ATMOSPHERE | TEMPERATURE (°C.) | TIME (m) | ATMOSPHERE | TEMPERATURE (°C.) | TIME (mm) |
| 72 | 5h | E | | 35 | 120 | HYDROGEN | 600 | 60 | HYDROGEN | 1200 | |

TABLE 24

| TYPE | MIXED RAW MATERIAL SYMBOL | REINFORCING METALLIC PLATE MATERIAL SYMBOL | PORE FORMATION CONDITION | | | DEGREASING CONDITION | | | SINTERING CONDITION | | |
|---|---|---|---|---|---|---|---|---|---|---|---|
| | | | ATMOSPHERE | TEMPERATURE (°C.) | TIME (min.) | ATMOSPHERE | TEMPERATURE (°C.) | TIME (mm) | ATMOSPHERE | TEMPERATURE (°C.) | TIME (mm) |
| POROUS METALLIC MATERIAL OF THIS INVENTION | | | | | | | | | | | |
| 73 | 5i | E | AIR WITH 90% HUMIDITY | 40 | 60 | AIR | 500 | 30 | HYDROGEN | 1300 | 180 |
| 74 | 5j | E | | | | | | | | | 120 |
| 75 | 5k | B | | 25 | 15 | | 450 | | VACUUM | 1320 | |
| 76 | 5l | A | | 50 | 30 | | | 15 | HYDROGEN | 1200 | 30 |
| 77 | 5m | E | | 60 | 60 | | 550 | 120 | AIR | 920 | 120 |
| 78 | 5n | E | ARGON | 30 | 20 | | 500 | 100 | HYDROGEN | 1050 | |
| 79 | 5o | C | NITROGEN | | | HYDROGEN | 550 | 120 | | 1300 | 180 |
| 80 | 5p | C | | 40 | 60 | AIR | 450 | 30 | | | |

TABLE 25

| TYPE | POROUS METALLIC BODY | | | |
|---|---|---|---|---|
| | THICKNESS (mm) | OVERALL SPECIFIC SURFACE AREA (cm$^2$/cm$^2$) | OVERALL POROSITY (%) | POROSITY OF SKELETON (%) |
| POROUS METALLIC PLATE MATERIAL OF THIS INVENTION | | | | |
| 65 | 2.3 | 390 | 97 | 22 |
| 66 | 3.2 | 620 | 95 | 25 |
| 67 | 6.6 | 410 | 95 | 31 |
| 68 | 4.0 | 2800 | 82 | 52 |
| 69 | 0.8 | 350 | 97 | 21 |
| 70 | 0.9 | 1150 | 89 | 41 |
| 71 | 2.1 | 1200 | 88 | 33 |
| 72 | 3.1 | 310 | 97 | 11 |
| 73 | 10.4 | 420 | 96 | 25 |
| 74 | 19.2 | 630 | 95 | 33 |
| 75 | 3.4 | 2400 | 82 | 52 |
| 76 | 2.4 | 590 | 92 | 14 |
| 77 | 5.5 | 660 | 92 | 22 |
| 78 | 3.3 | 2900 | 81 | 54 |
| 79 | 0.9 | 710 | 93 | 23 |
| 80 | 1.0 | 880 | 92 | 31 |
| CONVENTIONAL POROUS METALLIC PLATE MATERIAL | | | | |
| | 3.0 | 41 | 95 | — |

The results shown in Table 25 reveal that all porous metallic bodies which constitute porous metallic plate materials 65 to 80 of the present invention have the skeleton which comprises the porous sintered metal, as shown in FIG. 1, and which has a high porosity of 10 to 60%, and that the porous metallic plates thus have extremely high specific surface areas, as compared with the conventional porous metallic plate material (Comparative Example 1) having the skeleton comprising a nonporous metal, as shown in FIG. 7.

As described above, the porous metallic plate materials of the present invention have very high specific surface areas and maintain strength due to the porous surface layers. The porous metallic plate materials thus exhibit excellent performance when applied to structural members of various machines and apparatus, and can satisfactorily comply with the demands for increasing performance and output of various machines and apparatus.

EXAMPLE 6

Description will now be made of an example in which an electrode of an alkaline secondary battery is formed.

A pure Ni powder having an average particle size of 9 μm, water-soluble methyl cellulose, glycerin, a surfactant, hexane and water were mixed in each of the compositions shown in Table 26 to form a slurry. The thus-formed slurry was formed into a sheet having a thickness of 0.4 mm by using the doctor blade method. The sheet was subjected to pore formation by being held in an atmosphere at a temperature 40° C. and humidity of 95% for the time shown in Table 26, and then dried in a far infrared dryer at a heater temperature set to 150° C. to produce a green sheet. The thus-produced green sheet was then maintained at 500° C. for 1 hour in air to remove the binder therefrom, and sintered by being held in an atmosphere of a gas mixture of $H_2$—$N_2$ (5 to 95%) at the temperature for the time, both of which are shown in Table 26, to produce spongelike porous metallic substrates 6a to 6j having a skeleton comprising a microporous sintered metal.

The average micropore size and porosity of the skeleton of each of the spongy porous metallic substrates 6a to 6j, and the overall porosity and specific surface area of each of the spongelike porous metallic substrates 6a to 6j were measured. The results are shown in Table 26.

The average micropore size of porosity of the skeleton were measured by image analysis of a section of a sample. The overall porosity of the spongy porous metallic substrate was measured from the dimensions and weight of a sample. The overall specific surface area of the spongelike porous metallic substrate was measured by the BET method, and converted into a value per volume (a value of specific surface area per weight is obtained by the BET method).

TABLE 26

| TYPE | SLURRY COMPOSITION (WT %) | | | | | | PORE FORMATION TREATMENT (hr) | SINTERING CONDITION | | CHARACTERISTIC VALUE OF SUBSTANCE | | | |
|---|---|---|---|---|---|---|---|---|---|---|---|---|---|
| | PURE Ni POWDER | METHYL CELLULOSE | GLYCERIN | SURF-ACTANT | HEXANE | WATER | | TEMPE-RATURE (°C.) | HOLDING TIME (hr) | AVERAGE PORE SIZE (μm) | AVERAGE MICROPORE SIZE OF SKELETON (μm) | POROSITY OF SKELETON (%) | SPECIFIC SURFACE AREA (cm²/cm³) |
| POROUS METALLIC SUBSTRATE | | | | | | | | | | | | | |
| 6a | 72.7 | 2.7 | 5.5 | 1.0 | 1.9 | BALANCE | 2 | 1350 | 1 | 420 | 2.0 | 25.1 | 550 |
| 6b | 72.0 | 2.5 | 4.5 | 1.5 | 2.2 | | 1 | 1350 | 3 | 380 | 0.6 | 12.4 | 400 |
| 6c | 71.5 | 3.0 | 5.0 | 1.2 | 2.5 | | 0.5 | 1300 | 1 | 220 | 3.5 | 30.4 | 520 |
| 6d | 73.2 | 3.2 | 4.0 | 1.2 | 3.0 | | 2 | 1250 | 1 | 550 | 7.6 | 28.6 | 460 |
| 6e | 71.0 | 2.5 | 6.0 | 1.0 | 2.5 | | 1 | 1200 | 2 | 500 | 5.1 | 31.5 | 500 |
| 6f | 66.4 | 4.4 | 5.5 | 1.2 | 2.7 | | 3 | 1150 | 2 | 620 | 10 | 33.6 | 690 |
| 6g | 68.5 | 3.0 | 7.0 | 5.0 | 3.0 | | 2 | 1350 | 1 | 520 | 3.7 | 29.1 | 440 |
| 6h | 69.5 | 2.8 | 5.5 | 3.0 | 3.2 | | 1 | 1120 | 1 | 660 | 14.8 | 42.0 | 710 |
| 6i | 73.2 | 2.5 | 5.0 | 2.0 | 1.3 | | 2 | 1350 | 5 | 290 | 0.5 | 10 | 310 |
| 6j | 68.5 | 6.0 | 4.0 | 1.0 | 2.7 | | 3 | 1100 | 1 | 690 | 19.3 | 55 | 1000 |
| CONVENTIONAL POROUS METALLIC SUBSTRATE | | | | | | | | | | | | | |
| | — | — | — | — | — | — | — | — | — | 460 | — | — | 40 |

A nickel (Ni) hydroxide powder having an average particle size of 10 μm, a cobalt (Co) hydroxide powder having an average particle size of 18 μm, carboxymethyl cellulose, Teflon powder and water were mixed at a ratio by weight of 100:5:0.5:4:4 to form a paste mixture. The thus-formed paste mixture was coated on the spongelike porous metallic substrates 6a to 6j shown in Table 26 so as to permeate the substrates, dried by being maintained at a temperature of 105° C. for 2 hours in atmosphere, and then press-rolled to a thickness of 0.5 mm and cut in a size of 10 cm×4 cm to produce positive electrodes (referred to as "electrodes of the present invention" hereinafter) 81 to 90 of alkaline secondary batteries of the present invention. The fill amount of nickel hydroxy powder of each of the resultant electrodes 81 to 90 of the present invention, and the average micropore size and porosity of the skeleton were measured. The results obtained are shown in Table 27.

rator, and sealed in a can together with an electrolyte of a 35% potassium hydroxide aqueous solution to produce a Size AA nickel-cadmium secondary battery.

All of the thus-obtained nickel cadmium secondary batteries were initialized by repeating charging and discharging operations 5 times under conditions in which the charging time is 10 hours and the discharging time is 2 hours, and then subjected to a life test by repeating complete charging and discharging operations 2,000 times under conditions in which the charging time is 5 hours and the discharging time is 2 hours. In this life test, the discharge capacity of each of the batteries was measured at the first and after 2,000 operations, and the results obtained are shown in Table 28. When the discharge capacity became below 80% of the first discharge capacity before the number of operations did not reach 2,000 times, the time the discharge capacity became under 80% of the first discharge capacity was regarded as the

TABLE 27

| TYPE | POROUS METALLIC SUBSTRATE | FILLING AMOUNT OF Ni HYDROXIDE POWDER (g) | AVERAGE MICROPORE SIZE OF ELECTRODE SKELETON (μm) | POROSITY OF ELECTRODE SKELETON (%) |
|---|---|---|---|---|
| | | ELECTRODE OF THIS INVENTION | | |
| 81 | 6a | 2.53 | 2.0 | 25.1 |
| 82 | 6b | 2.53 | 0.6 | 12.4 |
| 83 | 6c | 2.59 | 3.5 | 30.4 |
| 84 | 6d | 2.59 | 7.6 | 28.6 |
| 85 | 6e | 2.60 | 5.1 | 31.5 |
| 86 | 6f | 2.61 | 10.3 | 33.6 |
| 87 | 6g | 2.60 | 3.7 | 29.1 |
| 88 | 6h | 2.60 | 14.8 | 42.0 |
| 89 | 6i | 2.51 | 0.5 | 10.0 |
| 90 | 6j | 2.59 | 19.3 | 55.0 |
| | CONVENTIONAL ELECTRODE (COMPARATIVE EXAMPLE 2) | | | |
| | CONVENTIONAL POROUS METALLIC SUBSTRATE | 2.55 | — | — |

Each of these electrodes 81 to 90 of the present invention and a conventional electrode was used as a positive electrode, and a terminal is spot-welded at a predetermined position of the electrode. The electrode was then wound through a known cadmium negative electrode and a sepalife of the battery, and the life test was stopped. The number of times of operations for each battery is shown in Table 28. After the life test, the battery was dismantled, and the degree of electrolyte impregnation of the separator was measured. These results obtained are shown in Table 28.

TABLE 28

| TYPE | ELECTRODE SHOWN IN TABLE 2 | LIFE OF NICKEL-CADIUM SECONDARY BATTERY | | | DEGREE OF ELECTROLYTE IMPREGNATION OF |
|---|---|---|---|---|---|
| | | 1st DISCHARGE CAPACITY (mAh) | 2000th DISCHARGE CAPACITY (mAh) | NUMBER OF TIMES | SEPARATOR AFTER TEST (vol. %) |
| | | ICKEL-CADIUM SECONDARY BATTERY | | | |
| 81 | ELECTRODE OF | 1  711 | 621 | 2000 MORE | 86.5 |
| 82 | THIS INVENTION | 2  706 | 583 | 2000 MORE | 72.9 |
| 83 | | 3  742 | 622 | 2000 MORE | 88.3 |
| 84 | | 4  730 | 614 | 2000 MORE | 86.1 |
| 85 | | 5  737 | 598 | 2000 MORE | 87.2 |
| 86 | | 6  746 | 615 | 2000 MORE | 84.7 |
| 87 | | 7  739 | 605 | 2000 MORE | 73.7 |
| 88 | | 8  741 | 601 | 2000 MORE | 78.6 |
| 89 | | 9  702 | 579 | 2000 MORE | 71.2 |
| 90 | | 10  737 | 603 | 2000 MORE | 75.9 |
| 91 | CONVENTIONAL ELECTRODE (CONVENTIONAL EXAMPLE 2) | 720 | — | 958 | 40.5 |

Comparative Example 2

For comparison, Ni was deposited to a thickness of 20 $\mu$m on a urethane foam having an average pore size of 500 $\mu$m by electroless plating, and then held in air at 500° C. for 0.5 hour. The urethane component was then burned by holding the urethane foam in an atmosphere of a gas mixture containing $H_2$—$N_2$ (5 to 95%) at 950° C. for 1 hour to produce a conventional porous metallic substrate. The overall porosity and specific surface area of the resultant conventional porous metallic substrate are shown in Table 26.

A conventional positive electrode (referred to as a "conventional electrode" hereinafter) of an alkaline secondary battery was produced by the same method as Example 6 except that the conventional porous metallic substrate shown in Table 26 was used, and the fill amount of the Ni hydroxide powder was measured.

Figure 8:
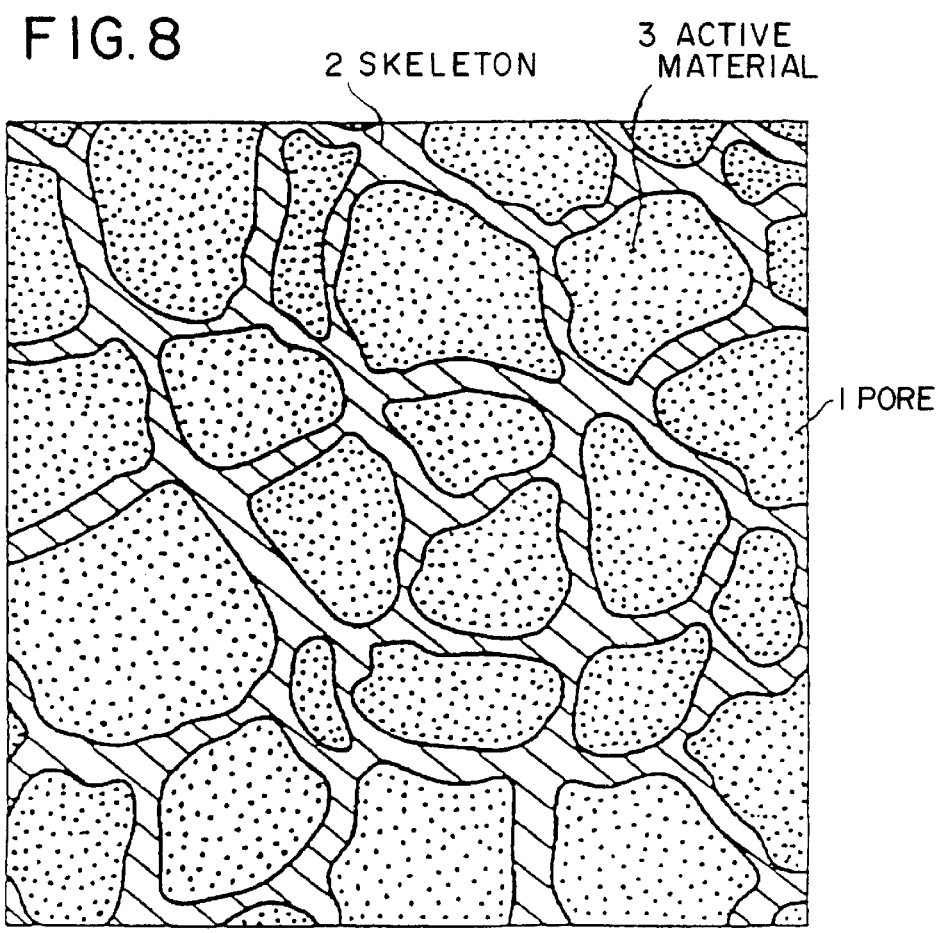
FIG. 8 is a drawing illustrating the sectional structure of an electrode of a conventional alkaline secondary battery.

FIG. 8 shows the sectional structure of the electrode in accordance with this comparative example. As shown in FIG. 8, in a spongelike porous metallic substrate having pores 1 formed by three-dimensional continuous network connection of a skeleton 2 comprising Ni metal, the pores are filled with an active material.

The conventional electrodes was subjected to the same life test as Example 6. The results obtained are shown in Table 28.

COMPARISON BETWEEN EXAMPLE 6 AND COMPARATIVE EXAMPLE 2

The results shown in Table 28 reveal that nickel-cadmium secondary batteries 81 to 90 respectively comprising the electrodes 80 to 90 of the present invention show larger number of times of operation and longer lives than nickel-cadmium secondary battery 91 (Comparative Example 2).

Although, in the example of the present invention, the electrodes 81 to 90 of the present invention are assembled into nickel-cadmium secondary batteries for the life test, the electrodes 81 to 90 of the present invention respectively comprising the spongelike porous metallic substrates 6a to 6j shown in Table 27 may be assembled into nickel-hydrogen batteries for the life test. In this case, the lives of the secondary batteries were increased. It was further found that even when the spongelike porous metallic substrates 6a to 6j shown in Table 26 are used as negative electrodes of nickel-cadmium secondary batteries or nickel-hydrogen secondary batteries, increases in lives can be attained.

As described above, the use of the electrode of an alkaline secondary battery of the present invention exhibits the following excellent effects:

(1) Since the electrolyte held in the micropores of the skeleton comprising a microporous sintered metal oozes out when the electrolyte in the alkaline secondary battery is consumed, this supplements the shortage of electrolyte, thereby increasing the life of the battery.

(2) When the electrolyte is solidified by corrosion of a can and thus becomes insufficient, the electrolyte held in micropores of the skeleton of the spongelike porous metallic substrate used as a negative electrode which contacts the can of a closed alkaline secondary battery oozes out, supplementing the shortage of electrolyte, thereby increasing the life of the battery.

(3) When the meso-pores formed in surfaces of a positive active material powder are increased and start swelling, the electrolyte oozes out from the microporous skeleton of the spongelike porous metallic substrate used for a positive electrode in an amount corresponding to the amount of the electrolyte used for swelling, preventing exhaustion of the electrolyte, and thereby increasing the life of the battery.

EXAMPLE 7

Description will now be made of another example in which an electrode of an alkaline secondary battery is formed.

Each of the spongelike porous metallic substrates 6a to 6j shown in Table 26 was dipped in a saturated nickel nitrate aqueous solution at a temperature of 25° C. for 10 minutes, taken out of the solution, and then dried by being held in a dryer at a temperature of 110° C. for 10 minutes. The substrate was then dipped in a 25% potassium hydroxide aqueous solution at 50° C. for 10 minutes, taken out of the solution and then dried by being held in a dryer at a temperature of 110° C. for 30 minutes to convert into nickel hydroxide and fill the pores of each of the spongelike porous metallic substrates 6a to 6j and the micropores of the skeleton with nickel hydroxide.

Although the micropores of the skeleton of each of the spongelike porous metallic substrates 6a to 6j which were treated as described above were filled with nickel hydroxide, nickel hydroxide films were merely formed on the inner walls of the large pores of each of the spongelike porous metallic substrates 6a to 6j, and the large pores were not sufficiently filled with nickel hydroxide. Therefore, the pores were filled with nickel hydroxide by the treatment below to produce positive electrodes (referred to as "electrodes of the present invention" hereinafter) 92 to 101 of alkaline secondary batteries of the present invention.

Namely, the surface of each of the spongelike porous metallic substrates 6a to 6j treated as described above was coated with a paste mixture comprising a Ni hydroxide powder having an average particle size of 10 $\mu$m, a Co hydroxide powder having an average particle size of 18 $\mu$m, carboxymethyl cellulose, Teflon powder and water at a ratio by weight of 100:5:0.5:4:41 so that the substrate was impregnated with the mixture. The substrates were dried by being held in air at a temperature of 105° C. for 2 hours, rolled under pressure to a thickness of 0.5 mm and then cut in a size of 10 cm×4 cm to produce electrodes 92 to 101 of the present invention.

The amount of the Ni hydroxide powder contained in each of thus-obtained electrodes 92 to 101 of the present invention was measured. The results obtained are shown in Table 29. For comparison, a conventional positive electrode (referred to as a "conventional electrode" hereinafter) of an alkaline secondary battery was produced by the same method as described above except that the conventional nickel foam shown in Table 26 was used, and the amount of Ni hydroxide powder contained in the conventional electrode was measured. The result is shown in Table 29.

Each of invention electrodes 92 to 101 of the present invention was used as a positive electrode, and a terminal was spot-welded at a predetermined position of the electrode. The positive electrode was then wound through a known cadmium negative electrode and a separator, and sealed in a can together with a 35% potassium hydroxide aqueous solution to produce a Size AA nickel-cadmium secondary battery.

Each of all resultant nickel-cadmium secondary batteries was first initialized by repeating charging and discharging operations 5 times under,conditions in which the charging time is 10 hours, and the discharging time is 2 hours, and then repeatedly completely charged and discharged 500 times under conditions in which the charging time is 5 hours and the discharging time is 2 hours. The discharge capacity was measured at the 1st, 250th and 500th operations, and the results obtained are shown in Table 29.

The results shown in Table 29 reveal that the electrodes 92 to 101 of the present invention contain. larger amounts of Ni hydroxide than the conventional electrode, and that the nickel-cadmium secondary batteries respectively comprising the electrodes 92 to 101 of the present invention have higher capacity than the nickel-cadmium secondary battery comprising the conventional electrode.

Although, in this example of the present invention, the electrodes 92 to 101 of the present invention were assembled into the nickel-cadmium secondary batteries for the capacity test, the electrodes 92 to 101 of the present invention respectively comprising the spongelike porous metallic substrates 6a to 6j shown in Table 29 may be assembled into nickel-hydrogen secondary batteries so that the capacities are increased. It was also found that an increase in capacity can be achieved by filling the spongelike porous metallic substrates 6a to 6j shown in Table 29 with an active material other than nickel hydroxide.

As described above, the use of the electrode of an alkaline secondary battery of the present invention exhibits the excellent effects of increasing the amount the active material contained in the electrode, and promoting an increase in capacity of the battery.

4. A porous metallic plate material with a high specific surface area comprising a skeleton in a three-dimensional network structure which is composed entirely of a sintered metal powder having a porosity of 10 to 60%, and a porous surface layer which is provided on one or both sides of the metallic plate material and which has pores formed by the skeleton which are relatively smaller than internal pores, wherein the overall porosity is 80 to 99%.

5. A porous metallic plate material with a high specific surface area comprising a porous metallic body and a reinforcing plate, wherein the porous metallic body comprises a skeleton in a three-dimensional network structure which is composed entirely of a sintered metal powder having a porosity of 10 to 60%, and the overall porosity is 80 to 99%.

6. A porous metallic plate material according to claim 5, wherein the reinforcing plate is selected from a network material, a plate and a perforated plate.

7. A porous metallic plate material according to claim 5 or 6, wherein the reinforcing plate is held in the porous metallic body.

8. A method of producing a porous metallic material according to claim 1, comprising the steps of:
   preparing a foamable slurry containing a metal powder;
   forming the foamable slurry;
   drying the formed product; and
   burning the dry formed product.

TABLE 29

| | | | CAPACITY OF NICKEL-CADIUM SECONDARY BATTERY | | |
|---|---|---|---|---|---|
| TYPE | POROUS METALLIC SUBSTRATE USED | CONTENT OF Ni HYDROXIDE OF ELECTRODE (g) | 1st DISCHARGE CAPACITY (mAh) | 250th DISCHARGE CAPACITY (mAh) | 500th DISCHARGE CAPACITY (mAh) |
| | | ELECTRODE OF THIS INVENTION | | | |
| 92 | 6a | 3.02 | 866 | 798 | 779 |
| 93 | 6b | 3.00 | 860 | 805 | 771 |
| 94 | 6c | 3.11 | 890 | 836 | 788 |
| 95 | 6d | 3.05 | 876 | 825 | 782 |
| 96 | 6e | 3.00 | 860 | 808 | 765 |
| 97 | 6f | 3.09 | 885 | 835 | 780 |
| 98 | 6g | 3.11 | 888 | 810 | 779 |
| 99 | 6h | 3.35 | 959 | 898 | 850 |
| 100 | 6i | 3.04 | 870 | 821 | 779 |
| 101 | 6j | 3.20 | 912 | 860 | 815 |
| | | CONVENTIONAL ELECTRODE | | | |
| | CONVENTIONAL POROUS METALLIC SUBSTRATE | 2.25 | 720 | 658 | 623 |

What is claimed is:

1. A porous metallic material with a high specific surface area comprising a skeleton in a three-dimensional network structure which is composed entirely of a sintered metal powder having a porosity of 10 to 60%, wherein the overall porosity is 80 to 99%.

2. A porous metallic material with a high specific surface area according to claim 1, wherein the overall specific surface area is 300 to 11000 $cm^2/cm^3$.

3. A porous metallic material according to claim 1, wherein the pores formed by the skeleton have an average pore size of 60 to 700 $\mu$m.

9. A method of producing a porous metallic material according to claim 8, wherein the foamable slurry contains a foaming agent, a water-soluble resin binder and a surfactant.

10. A method of producing a porous metallic material according to claim 8, further comprising the foaming step between the forming step and the drying step.

11. A method of producing a porous metallic material according to claim 8, the metal powder has an average particle size of 0.5 to 500 $\mu$m.

* * * * *